United States Patent [19]

Shirane et al.

[11] Patent Number: 5,491,631
[45] Date of Patent: Feb. 13, 1996

[54] FAULT DIAGNOSTIC SYSTEM FOR VEHICLES USING IDENTIFICATION AND PROGRAM CODES

[75] Inventors: Yoshiyuki Shirane; Seiichi Iwasa; Yoshio Suzuki; Kiyoshi Kuramochi; Kazuo Kokubo; Tetsuya Ohno; Kimio Mizuno; Takashi Satoh, all of Saitama, Japan

[73] Assignee: Honda Giken Kogyo Kabushiki Kaisha, Tokyo, Japan

[21] Appl. No.: 328,341

[22] Filed: Oct. 21, 1994

Related U.S. Application Data

[63] Continuation of Ser. No. 988,443, Dec. 9, 1992, abandoned.

[30] Foreign Application Priority Data

| Dec. 25, 1991 | [JP] | Japan | 3-357221 |
| Dec. 25, 1991 | [JP] | Japan | 3-357222 |
| Dec. 25, 1991 | [JP] | Japan | 3-357223 |
| Dec. 25, 1991 | [JP] | Japan | 3-357224 |
| Dec. 25, 1991 | [JP] | Japan | 3-357226 |
| Dec. 25, 1991 | [JP] | Japan | 3-357227 |
| Dec. 25, 1991 | [JP] | Japan | 3-357228 |
| Dec. 25, 1991 | [JP] | Japan | 3-358180 |

[51] Int. Cl.$^6$ .................. G06G 7/76; B60Q 1/00; G01L 3/26
[52] U.S. Cl. .................. 364/424.04; 364/424.03; 364/551.01; 364/431.11; 364/431.12; 340/459; 340/870.09; 340/518; 340/529; 340/438; 340/439; 340/825.54; 340/825.52; 73/117.3; 73/117.2; 73/118.1; 73/116; 395/905; 395/911; 123/479
[58] Field of Search .................. 364/431.01–431.12, 364/424.02, 424.03, 424.04, 550, 551.01; 73/116, 117.2, 117.3, 118.1; 123/571, 676, 568, 479; 340/438, 439, 459, 870.09, 518, 529, 825.54, 825.52; 395/905, 811

[56] References Cited

U.S. PATENT DOCUMENTS

| 4,267,569 | 5/1981 | Baumann et al. | 364/431.01 |
| 4,271,402 | 6/1981 | Katsura et al. | 364/431.11 |
| 4,277,772 | 7/1981 | Katsura et al. | 340/459 |
| 4,404,639 | 9/1983 | McGuire et al. | 364/431.11 |
| 4,410,938 | 10/1983 | Higashiyama | 364/431.11 |
| 4,442,424 | 4/1984 | Shirasaki et al. | 364/431.11 |
| 4,694,408 | 9/1987 | Zaleski | 364/551 |
| 4,757,463 | 7/1988 | Ballou et al. | 364/551 |
| 4,764,884 | 8/1988 | Noyori | 364/431.11 |
| 4,796,206 | 1/1989 | Boscove et al. | 364/551.01 |
| 4,831,560 | 5/1989 | Zaleski | 364/551.01 |
| 4,839,811 | 6/1989 | Kanezae et al. | 364/424.03 |
| 4,924,391 | 5/1990 | Hirano et al. | 364/424.03 |
| 4,924,398 | 5/1990 | Fujiwara | 364/431.11 |
| 4,926,330 | 5/1990 | Abe et al. | 364/431.01 |
| 4,926,352 | 5/1990 | Staffe | 364/431.01 |
| 4,962,456 | 10/1990 | Abe et al. | 364/431.01 |
| 4,989,146 | 1/1991 | Imajo | 364/424.04 |
| 4,996,643 | 2/1991 | Sakamoto et al. | 364/424.03 |
| 5,003,478 | 3/1991 | Kobayashi et al. | 364/424.03 |
| 5,003,479 | 3/1991 | Kobayashi et al. | 364/424.03 |

(List continued on next page.)

*Primary Examiner*—Kevin J. Teska
*Assistant Examiner*—Jacques H. Louis-Jacques
*Attorney, Agent, or Firm*—Pollock, Vande Sande & Priddy

[57] ABSTRACT

A memory stores a vehicle identifier code which enables identification of a vehicle carrying the same type of electronic control unit (ECU) correspondingly to an ECU identification code (ECU-ID) and display means for displaying the vehicle identifier code is displayed on the basis of the ECU-ID provided by an ECU, and a predetermined fault diagnostic program corresponding to the vehicle identifier code is selected and initiated in response to the input of a verification signal of the displayed vehicle identifier code. When a plurality of faulty parts of a vehicle are detected, a priority table is referred to and fault codes corresponding to the plurality of faulty parts are displayed with priority. The necessary specific work procedure is sequentially displayed according to the selected diagnostic program.

10 Claims, 28 Drawing Sheets

U.S. PATENT DOCUMENTS

| | | | |
|---|---|---|---|
| 5,050,080 | 9/1991 | Abe | 364/424.04 |
| 5,072,391 | 12/1991 | Abe | 364/424.04 |
| 5,107,428 | 4/1992 | Bethencourt et al. | 364/424.04 |
| 5,243,949 | 9/1993 | Osawa | 123/571 |
| 5,276,619 | 1/1994 | Ohara et al. | 364/424.04 |
| 5,388,045 | 2/1995 | Kamiya et al. | 364/551.01 |

FIG. 4A

```
MODEL : CIVIC
DEST  : CALIFORNIA
ENG   : 1.5 DOHC
MT    : 4AT
```

FIG. 4B

```
JHM ┌EG8  5  8N┐ □□□□□
    │EM9  6  7 │
    └──────────┘
```

FIG. 4C

```
JHM  EG8  5  8N  □□□□□
```

FIG. 4D

```
JHM  EG8  5  8N  5 0 0 0 0 1
```

FIG. 4E

```
JHM  EG8  5  8N 6 5 0 0 0 0 1
```

| PRIORITY | SYMBOL MARK | FAULT CODE |
|---|---|---|
| 1 | ECU | 0 |
| 2 | PB | 3, 5 |
| 3 | CRK | 4 |
| ⌇ | ⌇ | ⌇ |
| 10 | PA | 13 |
| 11 | TA | 10 |
| ⌇ | ⌇ | ⌇ |
| 20 | EGR | 12 |
| 21 | O$_2$ | 1, 2, 43, 44 |

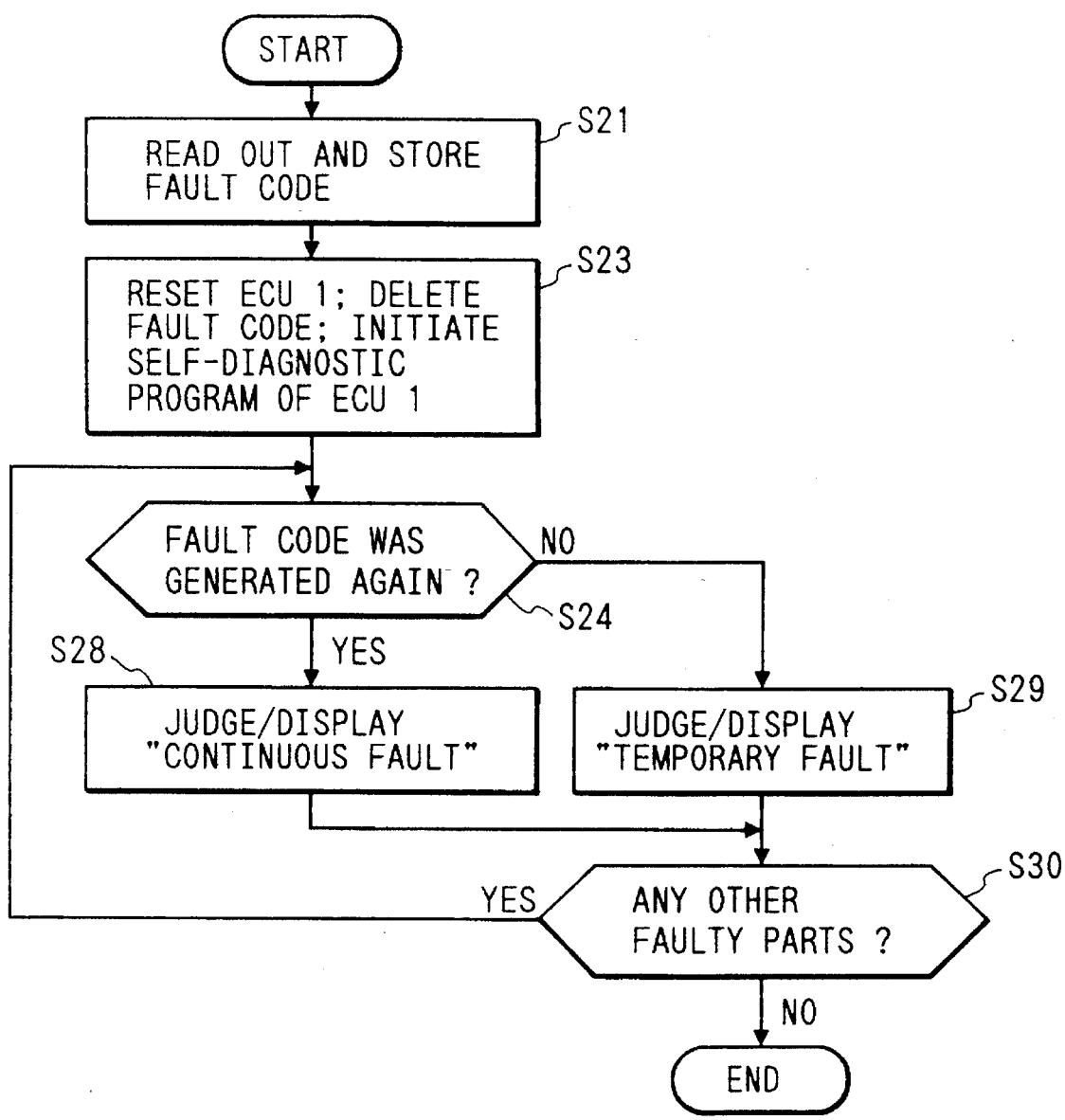

FIG. 18

| WORK INSTRUCTIONS DATA (CONNECTOR TO BE DISCONNECTED, VOLTAGE APPLY POSITION) | APPLIED VOLTAGE DETECTION | FAULTY PORTION AND STATES |
|---|---|---|
| CONNECTOR 17C | DETECTED | INTERNAL WIRE BREAKING OF SENSOR 4A |
| CONNECTOR 17B | DETECTED | WIRE BREAKING BETWEEN CONNECTORS 17B AND 17C |
| CONNECTOR 17A | DETECTED | WIRE BREAKING BETWEEN CONNECTORS 17A AND 17B |
| | UNDETECTED | INTERNAL CIRCUIT FAULT OF ECU 1 |

FIG. 20

| WORK INSTRUCTION DATA (CONNECTOR TO BE SHAKED) | SENSOR OUTPUT VOLTAGE | FAULTY PORTION AND STATES |
|---|---|---|
| CONNECTOR 17C | ABNORMAL | CONTACT FAILURE OF CONNECTOR 17C |
| CONNECTOR 17B | ABNORMAL | CONTACT FAILURE OF CONNECTOR 17B |
| CONNECTOR 17A | ABNORMAL | CONTACT FAILURE OF CONNECTOR 17A |
| | NORMAL | INTERNAL CIRCUIT FAULT OF ECU 1 |

FIG. 24

| WORK INSTRUCTIONS DATA (CONNECTOR TO BE DISCONNECTED, PULSE DETECTING POSITION) | PULSE DETECTION STATUS | FAULTY PORTION AND STATES |
|---|---|---|
| CONNECTOR 17C | UNDETECTED | INTERNAL WIRE BREAKING OF SENSOR 4A |
| CONNECTOR 17B | UNDETECTED | WIRE BREAKING BETWEEN CONNECTORS 17B AND 17C |
| CONNECTOR 17A | UNDETECTED | WIRE BREAKING BETWEEN CONNECTORS 17A AND 17B |
| | DETECTED | INTERNAL CIRCUIT FAULT OF ECU 1 |

FAULT DIAGNOSTIC SYSTEM FOR VEHICLES USING IDENTIFICATION AND PROGRAM CODES

This application is a continuation of U.S. patent application Ser. No. 07/988,443, filed Dec. 9, 1992, now abandoned.

BACKGROUND OF THE INVENTION

1. Field of the Invention

The present invention is related to a fault diagnostic system for vehicles which is adapted to communicate with an electronic control unit carried on a vehicle such as a car and provided with a self-diagnostic function of detecting and recording faults of various sensors and actuators, and based on the communication result, finds the failures of the electronic control unit and the peripheral equipment connected thereto.

2. Description of the Prior Art

Recently, a computer-aided electronic control unit (hereinafter referred to as ECU) has been increasingly mounted as a control unit such as an electronic fuel injection unit or anti-lock braking system (ABS). The ECU takes in the output signals from various sensors such as a pressure sensor for detecting the negative pressure of the air intake manifold, a temperature sensor for detecting the temperature of the cooling water for the engine, and a revolution sensor for detecting the number of revolutions of the engine, and controls the actuators according to predetermined programs based on these signals.

There is a known fault diagnostic system which is adapted to be connected to the ECU to check faulty parts of a vehicle when a failure occurs in the ECU or its peripheral equipment (sensors, actuators and connectors). A fault diagnostic program for finding out a faulty part is registered in the fault diagnostic system. The fault diagnostic system communicates with the ECU according to the fault diagnostic program stored therein to determine the faulty part based on the communication result, and displays it on a display device (LCD or CRT). In addition, if it is judged that there are a plurality of faulty parts, all of them are displayed on the display device. The repairman can confirm the faulty parts by this display and promptly take a proper action.

Since a plurality of fault diagnostic programs are prepared in general, a fault diagnostic program suitable for a target ECU to be tested is manually or automatically selected prior to fault diagnosis.

In the system in which a fault diagnostic program is automatically selected, the identification code of the ECU (hereinafter, referred to as ECU-ID) connected to the system is first obtained from the ECU. According to the ECU-ID thus obtained, a predetermined diagnostic program is selected from the plurality of faulty diagnostic programs prepared in advance.

An example of the fault diagnostic system adapted to be connected to the ECU carried on a car through a bidirectional communication interface is described in the Japanese Patent Kokai official gazettes 64-52551 and 63-78041.

In the conventional fault diagnostic system, a fault diagnostic program is selected only based on a type of an ECU. On the other hand, if a faulty vehicle is repaired, the fault diagnostic program and the vehicle must conform to each other.

However, the vehicle or engine type may differ even for the same ECU, and thus it may take time to identify the faulty portion and/or part if a fault diagnostic program is selected only based on the ECU type as has conventionally been done. As a result, instructions on the parts supply based on the diagnostic result may not be properly provided.

Further, there is a system which transmits the diagnostic result to the maker's host computer through a public telecommunication line. By such system, the car maker can classify and store the transmitted data to classify and analyze the tendencies and causes of failures, and establish a proper and prompt quality certification and parts supply systems. However, with the traditional method of storing failure data only by classification for each ECU, it is difficult to accurately recognize the causes and tendencies of failures.

In the conventional system, if a plurality of faulty portions are detected, all of them are displayed, but it may be possible that some of them are not really out of order. For instance, since a particular control system affected by the error signal output from the true faulty portion may output a signal deviating from a reference value for normal operation, said particular control system also would be judged faulty. An example of such a case, wherein an apparent faulty state of one part is produced by the true failure of a different part, is described with reference to FIG. 6.

In FIG. 6, for instance, water temperature sensor diagnostic means 31A monitors the output of water temperature sensor 34A, and generates a water temperature fault signal if the output signal deviates from a predetermined characteristic or threshold value, and displays the fault thereof on a display device. Air-fuel ratio control system diagnostic means 31B monitors the solenoid activation signal of injector (fuel injection unit) 35A, the output signal of $O_2$ sensor 36A and the operation of air-fuel ratio control system 37A, and causes a fuel system fault code to be displayed on the display device if there is any failure.

In the above fault diagnostic system, if water temperature sensor 34A is actually faulty and wrong water temperature data is supplied to air-fuel ratio control system 37A, air-fuel ratio control system 37A performs a predetermined processing on the basis of the wrong water temperature data and outputs a wrong activation signal to injector 35A. Since this activation signal is based on the wrong water temperature data, an adequate fuel injection is not performed, and eventually the output signal of $O_2$ sensor 36A deviates from a predetermined range. As a result, a fuel system fault signal is output from air-fuel ratio control system diagnostic means 31b. As is obvious, since $O_2$ sensor 36A is not actually faulty, the faulty state is still unimproved after $O^2$ sensor 36A is repaired or replaced according to the display of the fuel system fault signal.

In the prior art, the true faulty portion is estimated from a plurality of fault displays by the experiences and intuition of an operator of diagnosis to determine priority, and the faulty portion is further diagnosed and repaired based on the estimated priority. However, if the estimation of the operator happens to be wrong, a portion other than the true faulty portion is subjected to repairs, and thus there is a problem that the repairs are time-consuming because useless check work is included until the repairs are completed.

Strictly speaking, the fault detection of sensors and the like by an electronic control unit as described above is the detection of fault between the microcomputer in the electronic control unit and the sensor lines including wire harness and connector, and thus even if the electronic control unit detects the failure of a sensor, it cannot judge whether the failure is continuous or transient (temporary). Here, "continuous fault" means a fault which continues once it has occurred, such as a failure of the sensor itself or breaking of wire harness, while "transient (or temporary) fault" means a fault which is not always continued, such as a contact failure of the connector for connecting the sensor and the wire harness or connecting the wire harness and the electronic control unit, that is, the contact failure may or may not occur due to vibration or the like during the running of the vehicle.

For this, even after the fault of a sensor or wire breaking of a wire harness (continuous fault) has been detected by the electronic control unit, it is required to further check for the contact failure of the connector (transient fault) using other proper means, and therefore, fault diagnosis of the vehicle is difficult and the procedure thereof is complex, too.

As described above, when the ECU has a self-diagnostic function, if an abnormal signal out of a reference range is detected at the input terminals to which various connectors are connected, the ECU judges that a fault has occurred, and stores a code (fault code) for identifying the portion which has generated the abnormal signal and a value of the abnormal signal (fault data) (in this specification, hereinafter these may be expressed, in combination, as fault information).

The fault diagnostic system stores a fault diagnostic program, communicates with the ECU according to the fault diagnostic program, determines the faulty portion from the communication result (the above-mentioned fault code and fault data), and displays the faulty portion on a display device (LCD). The repairman verifies the faulty portion on the basis of the display and takes an appropriate action. Even if the failure of a sensor is detected by the ECU, the faulty portion is not always the sensor itself, but it may possibly be the microcomputer itself in the ECU or only a portion on the sensor line including the wire harness and connector.

Accordingly, the ECU cannot accurately identify the specific faulty portion even if it has detected the fault of a sensor. In order to finally identify the faulty portion, the repairman must refer to the repair manual or the like to examine the connector number, the pin number of the connector, the wire color, etc. constituting the wiring system, and must check the wire harness and connector using an inspection apparatus such as a tester. In addition, since the fault judgment as to whether or not it is faulty must be performed by the repairman according to the indicated value of the tester, the repairman must be skilled.

Moreover, there is a problem that fault diagnosis is difficult for faults in which the fault degree is difficult to quantitatively recognize, or faults in which the faulty portion cannot be identified from only the fault degree even if it can be quantitatively grasped.

Faults which cannot be diagnosed by the conventional fault diagnostic system because of inability to quantitatively recognize the fault state or faulty portion, are described below by taking, as examples, (1) deterioration of the "$O_2$ sensor" for detecting the air-fuel ratio (air amount/fuel amount) based on components of the exhaust gas, (2) failure of "EACV" (Electrical Air Control Valve) for providing a bypass between the upstream and downstream sides of the throttle valve, and (3) failure of "EGR" for recirculating the exhaust gas into the combustion chamber of the engine.

FIG. 31 is a block diagram of the suction and exhaust system of an engine for explaining the functions of the $O_2$ sensor, EACV and EGR.

To engine 173 are connected inlet manifold 175 for supplying a fuel gas and outlet manifold 174 for exhausting the gas after combustion. Throttle valve 176 is built in inlet manifold 175, and the throttle valve 176 is opened or closed by operation of the accelerator to control the number of revolutions of the engine.

Connected to inlet manifold 175 is EACV 170 for bypassing between the upstream and downstream sides of throttle valve 176. EACV 170 is an electromagnetic valve for supplying the fuel gas in surplus to engine 173 to increase the number of revolutions of the engine when a heavy lead is applied to the engine, as in the start-up or warm up of the engine, or when an electric lead such as an air conditioner is applied. EACV 170 consists of bypass passage 177 for bypassing the fuel gas, bypass valve 178 for adjusting the flow rate of the fuel gas, and solenoid coil 179 for controlling the opening of bypass valve 178.

The flow rate of the fuel gas bypassed by EACV 170 is continuously controlled by varying the magnitude of the electric current supplied from EACV driver circuit 172 to the solenoid coil 179 according to the instructions from ECU 1.

On the other hand, outlet manifold 174 and inlet manifold 175a downstream of throttle valve 176 are connected via EGR 150. EGR 150 is an exhaust gas recirculation equipment which recirculates the exhaust gas into the combustion chamber of the engine for afterburning of the unburnt gas, thereby to reduce the generation of NOx, and consists of first body 152 having control port 151, and second body 156 having atmospheric port 153, intake port 154, and exhaust port 155.

First body 152 and second body 156 are partitioned by diaphragm 157. Provided in the center of diaphragm 157 are compression spring 158 pressing diaphragm 157 toward second body 156, and valve plug 159 having one end fixed to diaphragm 157 and the other end opposed to exhaust port 155.

Displacement of valve plug 159 is detected by lift sensor 161. In second body 156, partition 160 is provided for separating the inside thereof between atmospheric port 153 and intake port 154. The output of lift sensor 161 is connected to ECU 1. Control port 151 is connected to inlet manifold 175 via electromagnetic valve 182 whose valve opening is controlled by ECU 1.

Since the recirculation amount of the exhaust gas (EGR amount) by EGR 150 depends on the opening of or position of valve plug 159, ECU 1 calculates the EGR amount; on the basis of the position signal of valve plug 159 given by lift sensor 161, and increases the valve opening of electromagnetic valve 182 if the EGR amount is less than a predetermined amount. As a result, the negative pressure of control port 151 becomes higher and diaphragm 157 is attracted toward first body 152 against the repulsion force of compression coil spring 158, so that the EGR amount flowing from intake port 154 to exhaust port 155 increases.

Provided downstream of outlet manifold 174 is $O_2$ sensor 183, the output signal of which is input to ECU 1. ECU 1 calculates the air-fuel ratio based on the detection signal provided by $O_2$ sensor 183, and controls the fuel amount injected by an injector (not shown) so that an optimum air-fuel ratio is obtained. The output of cooling water sensor 187 is provided to ECU 1, too.

Now, the causes of faults in the various portions shown in FIG. 31 are described.

(1) Deterioration of $O_2$ Sensor

The relationship between the air-fuel ratio in the supplied fuel gas and the output voltage of the $O_2$ sensor is as shown in FIG. 32. As it is known that the ideal air-fuel ratio is 14.7 and the output voltage of the $O_2$ sensor rapidly changes in the vicinity of the air-fuel ratio of 14.7, control of the air-fuel ratio is performed by decreasing the fuel supply amount if the output voltage of the $O_2$ sensor is high, while increasing it if the output voltage of the $O_2$ sensor is low. As a result, under the air-fuel ratio control based on the output voltage of $O_2$ sensor, the output voltage of the $O_2$ sensor takes a substantially sinusoidal waveform in normal condition as shown in FIG. 33.

If the $O_2$ sensor deteriorates, the variation of the output voltage for the change of the air-fuel ratio becomes slow (the frequency of the output voltage decreases) or the the output signal (difference between the maximum and minimum amplitude of values: P—P) becomes small, and thus the optimum air-fuel ratio cannot be maintained and the drivability of the vehicle lowers.

Since it was difficult to quantitatively measure such variations in frequency and amplitude by a device with simple construction, deterioration of the $O_2$ sensor could not be detected by a prior art fault diagnostic system.

(2) Failure of EACV

The flow rate of the fuel gas flowing in EACV 170 is continuously controlled by the electric current supplied from EACV driver circuit 172 to the coil 179 of the solenoid 171. But, when the opening of bypass valve 178 cannot be controlled in proportion to the current supplied to coil 179 due to deterioration of the moving portion or jamming in EACV 170, since it is difficult to quantitatively measure this it has been difficult to detect these hindrances by a prior art fault diagnostic system.

(3) Failure of EGR

Inoperativeness of the valve plug 159 of EGR 150 can be detected by referring to the position signal from lift sensor 161, but inoperativeness of valve plug 159 is not always generated by failure of EGR 150 and it is also generated by failure of electromagnetic valve 182. In other words, even if valve plug 159 is inoperative, the real cause of that inoperativeness cannot be simply judged on the basis of the quantitative value detected by lift sensor 161, and thus it has been difficult to detect this by a prior fault diagnostic system.

SUMMARY OF THE INVENTION

It is an object of the present invention to provide a fault diagnostic system for a vehicle which can provide fault diagnosis and classification with high accuracy oil the basis of data such as engine type and engine specification required for identifying a vehicle, and which can find a true faulty portion in a short time without requiring any special knowledge or experience.

It is a further object of the present invention to provide a fault diagnostic system for a vehicle which automatically and sequentially displays the optimum diagnostic condition and procedure for identifying the specific faulty portion according to the engine type and specification and the detected fault code.

It is a still further object of the present invention to provide a fault diagnostic system for a vehicle which compares the quantitative measurement result obtained in a known operation condition created by a known external signal input with the numeric value expected in the known operation condition, and performs fault diagnosis of each portion on the basis of the result of the comparison when diagnosing the failure of portions is difficult to quantitatively identify the fault state.

The present invention is characterized by the provision of means for storing a vehicle identifier code which enables identification of a vehicle carrying the same type of ECU correspondingly to ECU-ID, and display means for displaying the vehicle identifier code on the basis of the ECU-ID provided by an ECU, and selecting and initiating the predetermined fault diagnostic program corresponding to the vehicle identifier code in response to the input of the verification signal of the displayed vehicle identifier code.

The present invention is also characterized in that a priority table is provided to show the priority of fault diagnosis, and if a plurality of faulty portions are detected, the priority table is referred to and fault codes corresponding to the plurality of faulty portions are displayed with priority.

The present invention is further characterized by selecting a fault diagnostic program in response to selection instructions which are input according to the fault code display with priority.

The present invention is characterized by sequentially displaying the necessary specific work procedure according to the selected diagnostic program.

The present invention is characterized by judging whether the detected faults are continuous or transient (temporary), and sequentially displaying the respective optimum checking procedures.

BRIEF DESCRIPTION OF THE DRAWINGS

FIGS. 4A–4E are diagrams showing examples of vehicle identifier codes displayed on a display device.

FIG. 10 is a flowchart showing the operation of still another embodiment of the present invention.

FIG. 18 is a table showing a relationship example among the work instructions, applied voltage detection status and fault contents for continuous faults.

FIG. 20 is a table showing a relationship example among the work instructions, sensor voltage and fault contents for transient faults.

FIG. 24 is a table showing a relationship example among the work instructions, sensor voltage and fault contents in the method of FIG. 23.

DETAILED DESCRIPTION OF THE PREFERRED EMBODIMENT

Figure 2:
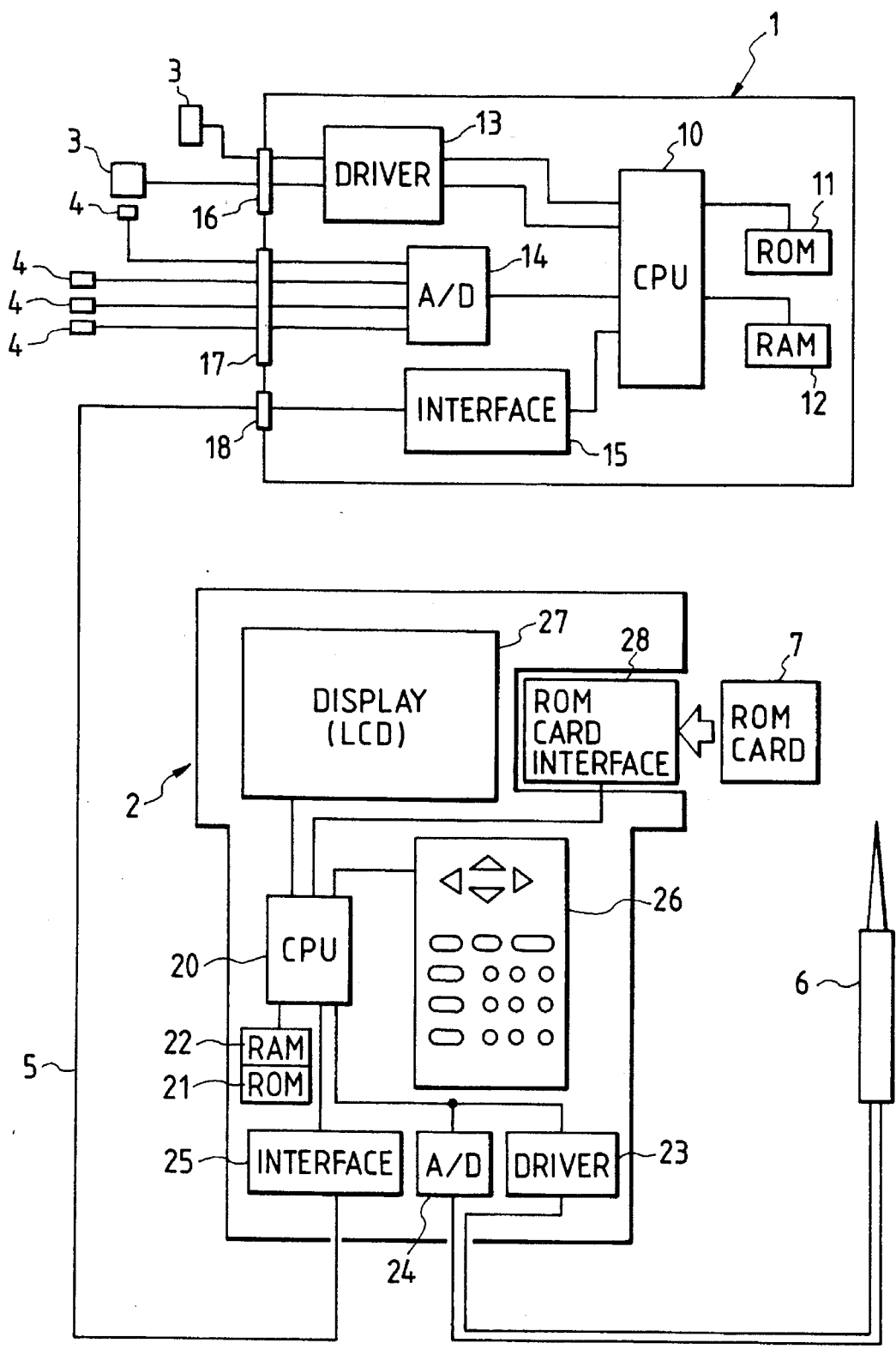
FIG. 2 is a block diagram showing the hardware configuration of the fault diagnostic system and ECU according to the present invention.

An embodiment of the present invention is described below with reference to the drawings. FIG. 2 is a block diagram showing the fault diagnostic system and the ECU on a vehicle to be diagnosed.

In ECU 1 are provided CPU 10, ROM 11, RAM 12, driver 13, A/D converter 14 and communication interface 15. ECU 1 is connected to peripheral equipment, for instance, actuators 3 and sensors 4 by connectors 16 and 17. And fault diagnostic system 2 is adapted to be connected to ECU 1 by connector 18.

Connected to connector 16 are actuators 3, and various sensors 4 are connected to connector 17. For instance, if ECU 1 is for the control of an EFI unit, solenoids are connected to connector 16 as actuators 3, and a TDC sensor, water temperature sensor, intake-air temperature sensor, throttle valve opening sensor and the like are connected to connector 17.

The signal from a sensor 4 is converted to a digital signal in A/D converter 14 and taken into CPU 10. The signal taken into CPU 10 is processed according to the program written in ROM 11 on the basis of data for control stored in ROM 11 and RAM 12. To driver 13, an instruction signal is input according to a result of the processing in CPU 10, and an actuator 3 is driven in response thereto.

In the ROM 11, the identification code or ECU-ID of ECU 1 is registered in addition to the program. In RAM 12, the result of the processing by CPU 10 is stored as learning data or freeze data. The freeze data represents the operation state of the engine when some inconvenience or trouble occurs in the engine.

In fault diagnostic system 2, CPU 20, ROM 21, RAM 22, driver 23, A/D converter 24 and communication interface 25 are provided, too, as in the ECU 1. In addition, fault diagnostic system 2 includes a keyboard 26 for the operator to input his instructions, and display device 27 for displaying the result of the processing by CPU 20. On keyboard 26, function keys to which the functions unique to the, present invention are assigned are provided in addition to a typical ten-key and cursor moving keys. A liquid crystal display (LCD) panel is suitable as display device 27.

Test probe 6 is connected to fault diagnostic system 2 for adding a voltage and resistance measuring function as a circuit tester and/or a constant-voltage output function. Since the voltage output from driver 23 is supplied to test probe 6, a pseudo (artificial) sensor signal can be provided to ECU 1. On the other hand, a signal captured with test probe 6 is converted to a digital signal in A/D converter 24 and taken into CPU 20.

Communication interfaces 15 and 25 of ECU 1 and fault diagnostic system 2 are connected via cable 5 so as to allow a bidirectional digital communication between CPU 10 and CPU 20.

The signal taken in from ECU 1 through cable 5 and the signal obtained at test probe 6 are processed on the program and/or control data stored in ROM 21 and RAM 22, and the processing result or fault diagnostic result is output to display device 27. To provide for optimal fault diagnosis for many types of vehicles, a plurality of fault diagnostic programs are previously prepared and registered in ROM 21.

In ROM 21, a table is stored for selecting the optimal one out of the plurality of fault diagnostic programs on the basis of VIN (vehicle identifier code) and ECU-ID. To select a fault diagnostic program, a man-machine system is used, in which the processing result is displayed stepwise on display device 27 on the basis of the input from keyboard 26, and then the processing is further proceeded according to the input from keyboard 26. The selection procedure of the fault diagnostic program will be described in detail later in connection with FIG. 3.

Since it is possible that addition or change of VIN is performed as new types of cars are produced, VIN and the selection program may be stored in ROM card 7 which is read into CPU 20 through ROM card interface 28. In addition, fault diagnostic programs can be added by ROM cards.

Fault diagnostic system 2 may be connected to a personal computer, not shown, so that the fault diagnostic result is stored in the personal computer and printed out as needed. The personal computer may be connected to the host computer of the vehicle maker through a public communication line, so that the fault diagnostic result can be supplied to and accumulated in the host computer. Conversely, necessary information, for instance, a revised version of a fault diagnostic program or selection program may be provided from the host computer to the personal computer and fault diagnostic system.

Preferably fault diagnostic system 2 contains a power supply battery so as to be portable, and the battery is preferably rechargeable as a NiCd battery or the like so that the power can be supplied even from the battery of a car through the socket of a lighter.

VIN which is used in this embodiment for selecting a fault diagnostic program is described. VIN is an identifier code for discriminating each vehicle from others, and assigned to each individual vehicle in a stamp or any other suitable form. In ROM 21 of fault diagnostic system 2, a VIN corresponding to the ECU-ID is stored. That is, as information which can identify a specific vehicle group carrying the same type of ECU, VIN is stored with the ECU-ID as a storage address.

Figure 5:
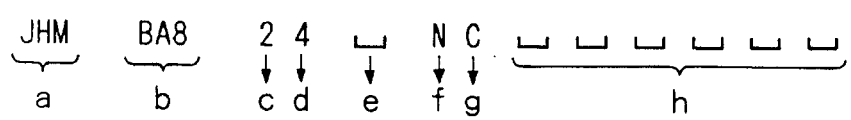
FIG. 5 is diagram showing an example of the vehicle identifier code.

A specific example of the VIN stored in the ROM 21 is described with reference to FIG. 5. In that figure, the leading code "a" represents the manufacturer code and car type, the second code "b" represents the types of body and engine, the third code "c" represents the number of doors and the transmission type, and the fourth code "d" represents a grade of vehicle. A check digit is input in space "e". That is, in this space "e", the numeric as the check digit in the VIN indicated on the vehicle is input by the operator's keyboard operation. The check digit is used to check out an input error of VIN. The code "f" next to the space "e" for the check digit represents the manufacture year of the vehicle, and the next code "g" represents the manufacturing factory. In the last space "h", a serial number of the vehicle is input by the operator's keyboard operation.

On the other hand, the ECU-ID stored in ROM 11 of ECU 1 consists of 5-byte data for instance, and each one byte data represents vehicle model, manufacture year, engine type, destination, equipment type and the like, respectively. The above-mentioned ECU-ID is only an example, and the types of data can appropriately increased or decreased.

Figure 3:
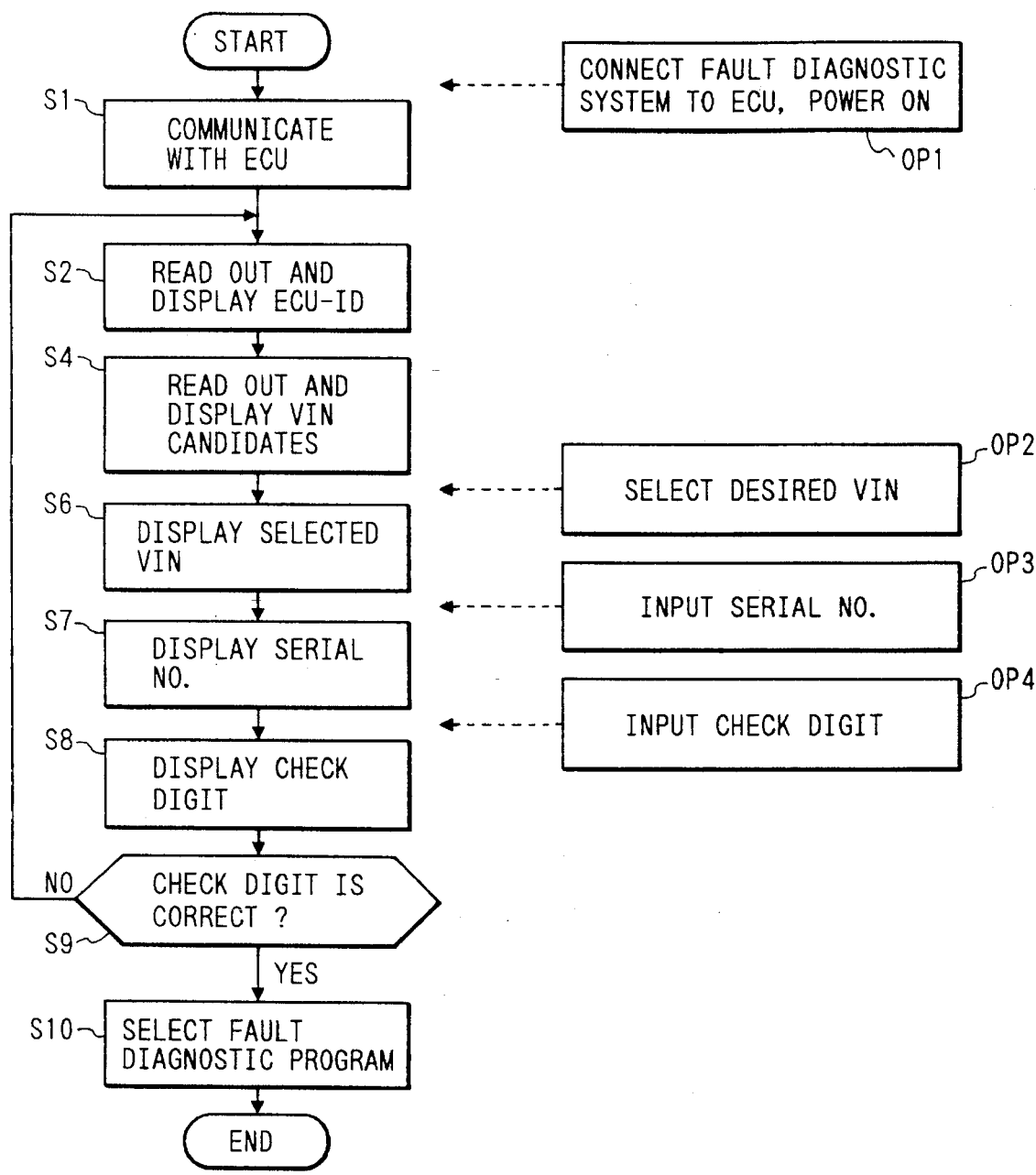
FIG. 3 is a flowchart showing the fault diagnostic program selection operation according to the present invention.

The operation of selecting a fault diagnostic program is described with reference to the flowchart of FIG. 3 and the display examples of the display device in FIGS. 4A–4E. In FIG. 3, an operation by the operator is shown by adding a code "OP". In the operation OP1, ECU 1 and fault diagnostic system 2 are connected first, and the power to fault diagnostic system 2 is turned on.

In step S1, the communication with the ECU is performed. In step S2, the ECU-ID is read out of ROM 11 of ECU 1 and displayed on display device 27 (display example: FIG. 4A). In this example, as the ECU-ID, the vehicle model, destination, engine type and transmission type are shown.

In step S4, the candidates for VIN carrying the ECU 1 are read out from ROM 21 and displayed on display device 27 with the ECU-ID as a retrieval key (display example: FIG. 4B). In this display example, two VIN candidates are shown.

In the operation OP2, a desired VIN is selected from the displayed VIN candidates with the cursor moving keys and the Enter key on keyboard 26. If only one VIN is displayed, the Enter key is pressed after verification. In step S6, the display of the selected VIN is left (display example: FIG. 4C).

In the operation OP3, a serial number is input from keyboard 26 according to the stamp on the vehicle. In step the input serial number is displayed (display example: FIG. 4D). In the operation OP4, a check digit is input from keyboard 26. In step S8, the input check digit is displayed (display example: FIG. 4E).

In step S9, the input check digit and a numeric as a reference data stored in ROM 21 are compared. If the comparison is successful, the process goes to step S10, where the VIN of the display example shown in FIG. 4E is read into the work area and the fault diagnostic program corresponding to the VIN is selected. Thereafter, for instance, a message such as "VIN input OK" is output to display device 27 to tell that fault diagnosis is available. On the other hand, if the judgment in step S9 is negative, the process returns to step S2 to perform the re-input processing of VIN.

If the display shows that the fault diagnosis is available, the operation of ECU 1 and the stored data in RAM 12 are checked to perform the fault diagnosis. The false or pseudo signal of the sensor may be input by test probe 6 to check the operation thereof as necessary. A specific example of the fault diagnostic operation will be described later on.

Figure 1:
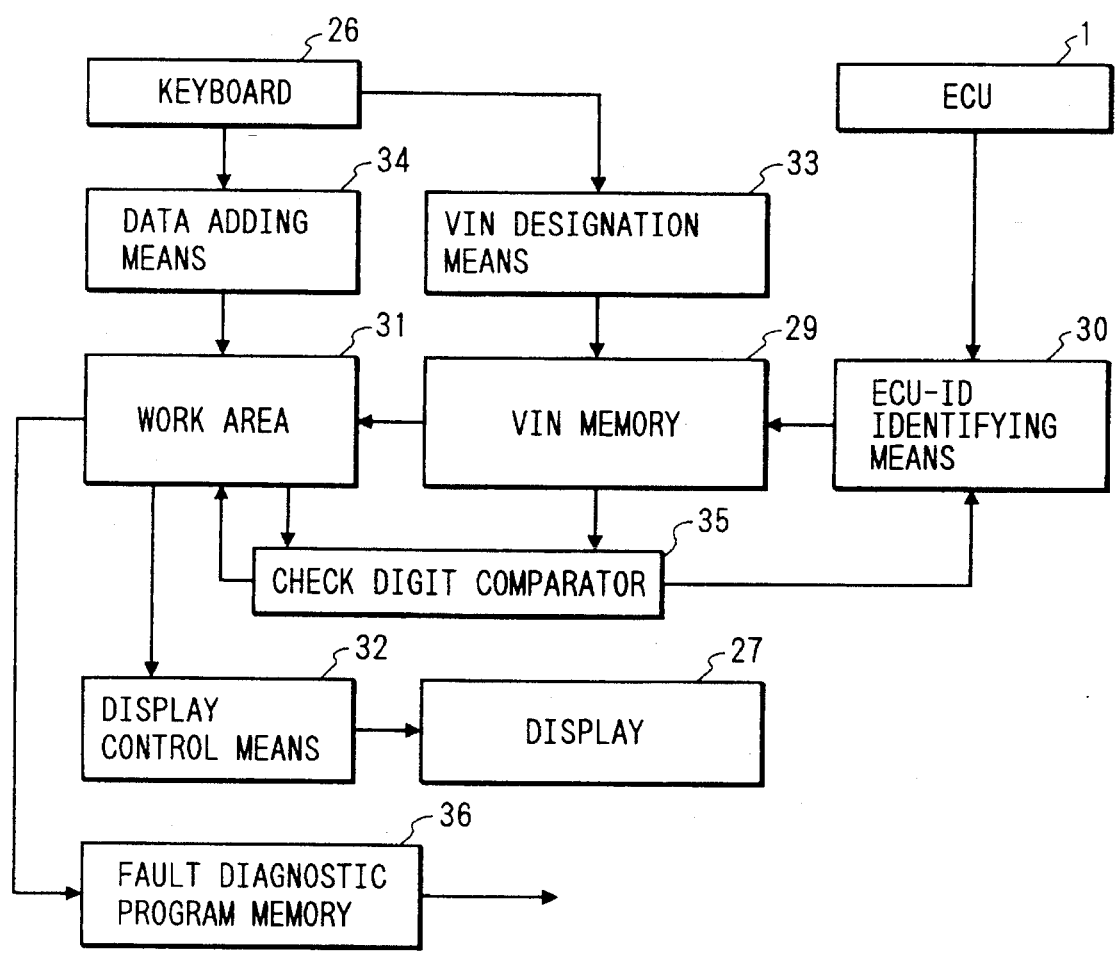
FIG. 1 is a principal functional block diagram of the fault diagnostic system showing an embodiment of the present invention.

The operation of selecting a fault diagnostic program is described with reference to the functional block diagram of FIG. 1, where VINs classified according to ECU-ID are stored in VIN storage means 29. ECU-ID identifying means 30 extracts an ECU-ID out of the data supplied by ECU 1. The extracted ECU-ID is supplied to VIN storage means 29 as a retrieval key, and the corresponding VINs among the VINs stored in VIN storage means 29 are read out into work area (storage area) 31 as candidates. The read VINs are transferred to display control means 32 and output to display device 27.

VIN designation means 33 outputs an instructions signal for selecting a VIN candidate according to the instructions by the cursor moving keys and/or Enter key on keyboard 26. VIN storage means 29 outputs to work area 31 a single VIN which corresponds to the instructions signal as a retrieval key. As a result, the contents of work area 31 are revised, and only one VIN is displayed on display device 27. A serial number and check digit are added to the VIN determined as mentioned above. Data adding means 34 takes in the data input from keyboard 26, namely, the serial number and check digit, and adds them to the VIN read into work area 31 for display.

Check digit comparator means 35 compares the check digit of the VIN stored in work area 31 with the check digit stored in VIN storage means 29, and if they do not match, outputs a mismatching signal to work area 31 and ECU-ID identifying means 30. Work area 31 is cleared in response to the mismatching signal, and ECU-ID identifying means 30 restarts the operation of detecting an ECU-ID.

On the other hand, if said two check digits match, the storage contents or VIN is read out of work area 31 in response to the matching signal supplied to work area 31, and supplied to fault diagnostic program storage means 36. The VIN read out from work area 31 serves as a key for selecting a particular fault diagnostic program from fault diagnostic program storage means 36. The selected fault diagnostic program is saved in a work area for fault diagnosis (not shown) and used for fault diagnosis. The serial number of the VIN data is not used as a retrieval key for detecting a fault diagnostic program, but it is used when the failure causes are studied and analyzed on the basis of the result of fault diagnosis and the content of repair which are accumulated in the host computer of the vehicle maker.

As described above, a fault diagnostic program can be selected by using both ECU-ID and VIN in this embodiment, and thus a fault diagnosis can be performed by a diagnostic program in accord with the norms of vehicle and ECU, whereby a proper and reliable fault diagnosis can be made. Since the operator is only requested to carefully input a serial number, the operation is simple. An input error is prevented by a check digit in subsequent procedures. When the cause of a failure is analyzed on the basis of the fault diagnostic result, information such as the model, destination, production year and production factory of a defective vehicle can accurately be gathered, and detailed data on defects for each vehicle is easily collected. If a plurality of faulty portions are detected by the diagnosis in the above described method, a fault diagnosis of the portion corresponding to the parameter is performed according to a priority table prestored in the ROM 21.

The priority shown in the table can be decided according to a criterion in which, for instance, the parameter for the basic control is provided with higher priority, and the correction control for correcting the result of the basic control is provided with lower priority.

For instance, in the control of EFI unit, the parameters used for the calculation of the basic fuel injection time, that is, the frequency of the crank pulses (CRK) representing the number of revolution of the engine and the negative pressure (PB) in the inlet manifold are parameters for the basic control. On the other hand, atmospheric pressure (PA), atmospheric temperature (PT) and the like used for pressure correction and temperature correction of the basic fuel injection time are parameters for the correction control. In addition to these criteria, other criteria based on experimental data or rule of experience can be taken into consideration.

Figures 6, 7:
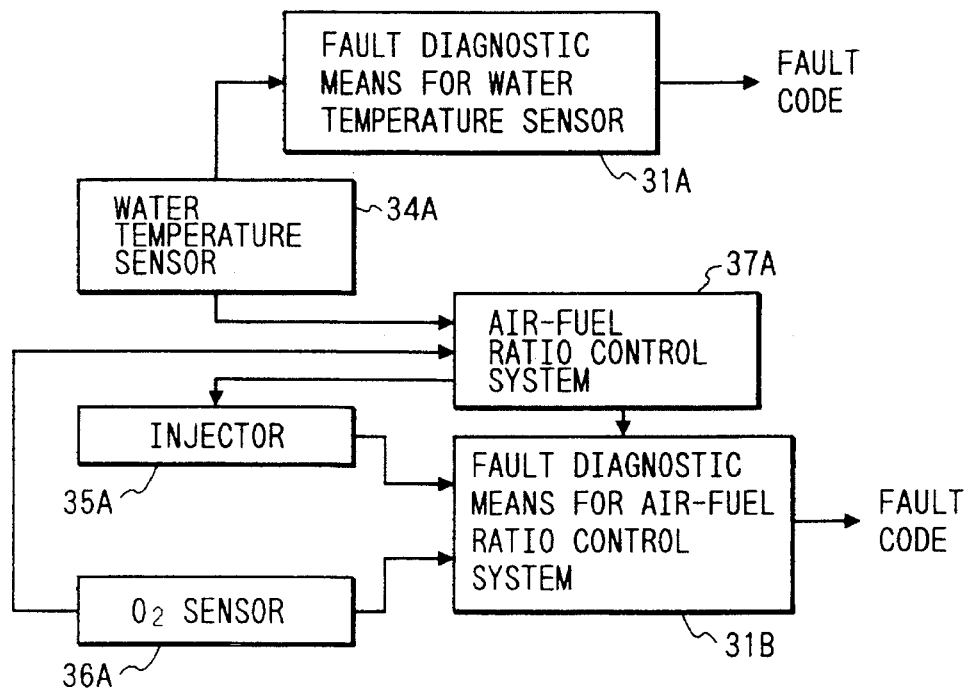
FIG. 6 is a block diagram for explaining a typical conventional fault diagnostic system.
FIG. 7 is a diagram showing an example of the priority table according to the present invention.

FIG. 7 is an example of the priority table, which includes symbol marks representing parameters, and fault code and priority corresponding to each of the symbol marks. In the example of FIG. 7, lower priorities are assigned to parts which generate signals susceptible to the signals from many other portions, such as the signal of the EGR (Exhaust Gas Recirculation) valve and the output signal value of the $O_2$ sensor.

Figure 9A:
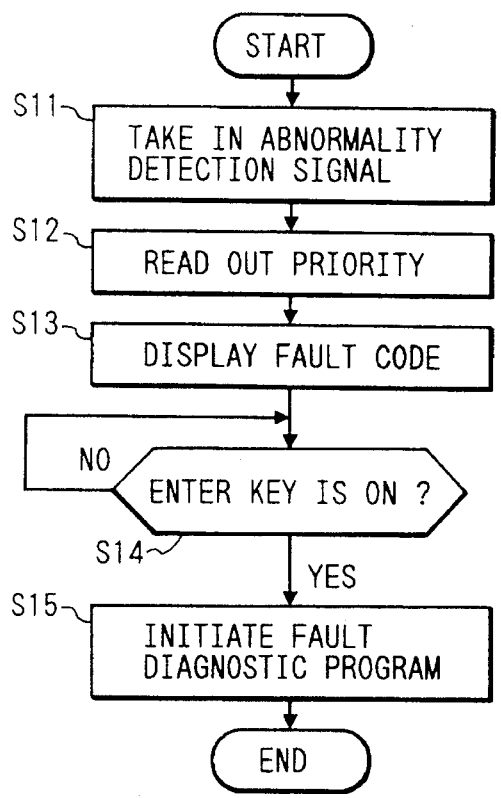
FIG. 9A is a flowchart showing the fault diagnostic program selection operation.
Figure 9B:
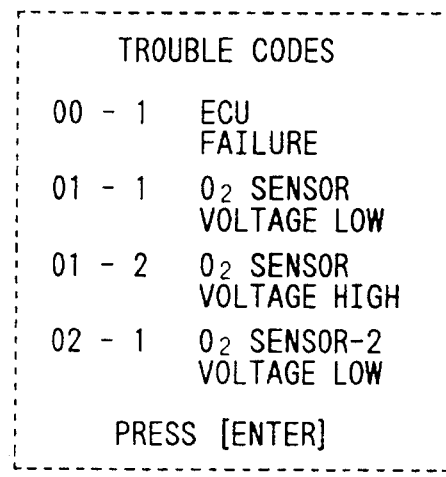
FIG. 9B is a diagram showing a display example of the display device.

The operation of selecting a fault diagnostic program is described with reference to the flowchart of FIG. 9A and the example of the display shown in FIG. 9B.

In step S11, the fault detection signal from a fault detecting means is taken in. Fault detecting means is provided for each sensor. The water temperature fault diagnostic means 31A and air-fuel ratio control system fault diagnostic means 31B shown in FIG. 6 are the examples of said fault detection means. The fault detection signals output from the respective fault diagnostic means include the fault codes shown in the table.

In step S12, priority is read out from the table with a fault code as a retrieval key. In step S13, the fault codes are displayed in display device 27 (FIG. 2) according to the read priority, as shown in the example of FIG. 9B.

In step S14, a desired fault code is selected by a cursor operation, and the inputting of execution instructions by the Enter key is waited for. When the Enter key is pressed, the process flows to step S15, where a fault diagnostic program is selected and initiated on the basis of the fault code pointed to by a cursor moving key.

Thus, the operator of diagnosis handles the cursor moving key to select a fault code and presses the Enter key, thereby initiating the fault diagnostic program corresponding to the fault code pointed to by the cursor.

For instance, if the fault code 01-1 is selected, it is judged whether reappearance of the fault is possible for checking the output voltage of the $O_2$ sensor, and the subsequent diagnostic flow is automatically selected according to the judgment. In the fault diagnosis, the false signal of the sensor may be input from test probe 6 to check the operation, as needed.

Since it is usually preferable to first execute the fault diagnosis corresponding to a fault code of high priority, the fault diagnostic system may be constructed so that the fault diagnosis is automatically started from a portion of high priority without operator instructions, but only with display for confirmation.

Figure 8:
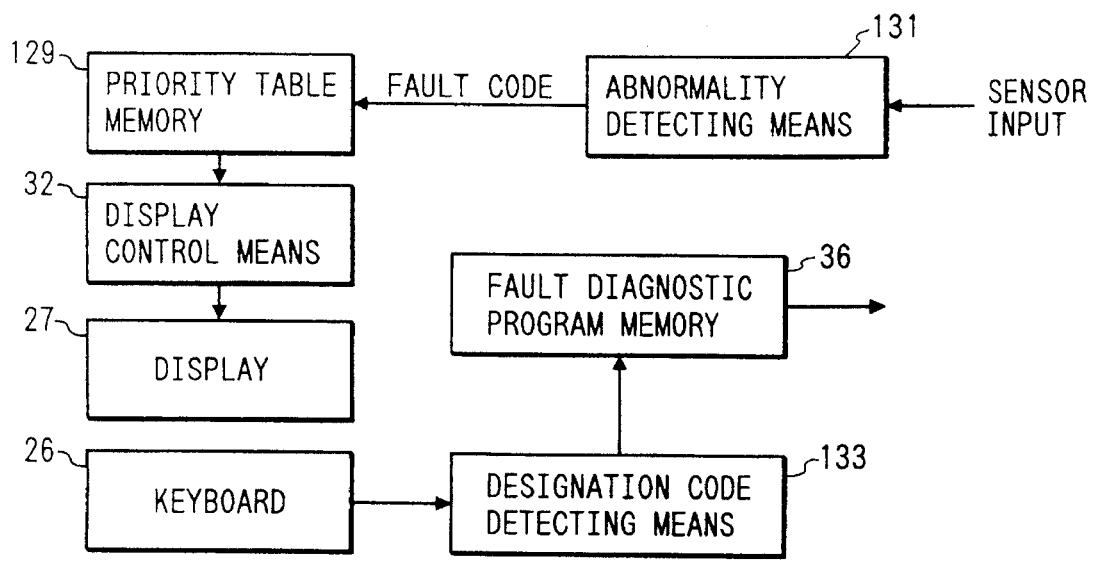
FIG. 8 is a main functional block diagram of the fault diagnostic system showing another embodiment of the present invention.

The function of the fault diagnostic system according to the second embodiment of the present invention is described with reference to the functional block diagram of FIG. 8. In priority table storage means 129, the priority table is stored so that the storage contents can be read out with a fault code as a retrieval key. Further, in fault diagnostic program storage means 36, a plurality of fault diagnostic programs are registered so that a diagnosis can be performed in accord with fault codes.

Abnormality detecting means 131 takes in the output signals from various sensors such as a crank pulse sensor and a negative pressure sensor, and outputs a fault code if the output signal indicates an abnormal value. The fault code is supplied to the priority table storage means 129, from which data showing the symbol mark is output with the fault code as a retrieval key. The data of the symbol mark is converted to image data in display control means 32, and output to display device 27. If there are a plurality of abnormal portions, the symbol marks are displayed on display device 27 according to their priorities. Not only the symbol marks of abnormal portions but also information specifically representing the abnormality of the sensor output signal can be displayed on display device 27 (refer to the display example of FIG. 9B). In this case, abnormality detecting means 131 is constructed so as to supply specific data showing abnormality to display control means 32.

Designation code detecting means 133 takes in the signal being input from keyboard 26 according to the display on display device 27, and detects the designated fault code. The detected fault code is supplied to fault diagnostic program storage memory 36, which outputs the fault diagnostic program corresponding to the abnormal portion to a work area (not shown) for fault diagnosis on the basis of the fault code.

In the second embodiment, if a plurality of abnormal portions are detected, which of these portions is desirably subjected to a fault diagnosis with priority is given to the operator on the basis of the information registered in the priority table, and thus the operator can recognize the abnormal portion which affects other structural elements and causes a faulty condition with high probability, that is, the true faulty portion, and a fitting fault diagnosis can be done in a short time.

Figure 19:
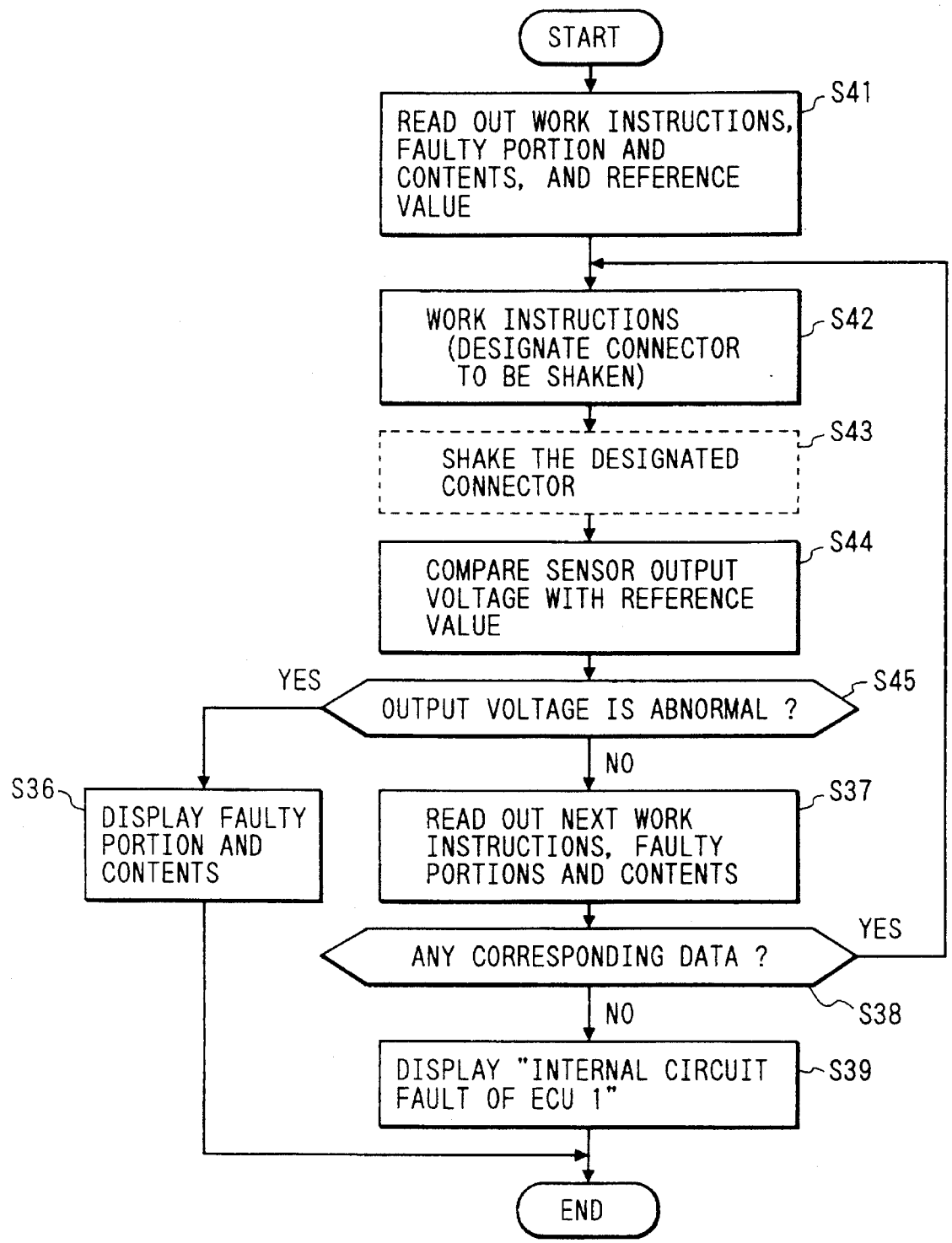
FIG. 19 is a detailed flowchart of an example, of the transient fault diagnostic program according to the present invention.

Using the flowchart of FIG. 10, description is made to the operation of the embodiment, in which, when the electronic control unit detects the fault of a sensor or the like by the above described approach, it is judged whether the fault is continuous or temporary. The operation of FIG. 19 is executed with the fault diagnostic system 2 being connected to the ECU 1 of a vehicle.

In step S21, the name of the faulty sensor and data or fault code representing the fault contents is read out from RAM 12 of ECU 1 and stored in RAM 22 in fault diagnostic system 2. The fault code may be the output signal (voltage value) of a sensor for instance. When the system voltage to be input to a sensor is d.c. 5 [V], the output voltage is, for instance, 0.05 to 4.95 [V] if the sensor is normal, while it is lower than 0.05 [V] or higher than 4.95 [V], respectively if the sensor is short-circuited to the ground side or includes a fault of wire breaking. In the above readout, the name of the faulty sensor and the like may be additionally displayed on display device 27.

In step S23, ECU 1 is reset, the fault codes in RAM 12 are deleted, and then the self-diagnostic program of ECU 1 is initiated. In step S24, it is judged whether or not the same fault code as the fault code detected in the step S21 is detected again. If the same fault code is detected, the fault is judged to be continuous in step S28. If a different fault code is detected (for instance, it was judged to be wire breaking before whereas it is judged to be short-circuit to the ground side), or if two fault codes are not in coincidence (that is, a fault code was output in step S21 whereas no fault code is detected during the self-diagnosis in step S23), said fault is judged to be temporary in step S29. In the respective fault judgments, the name of the faulty sensor, fault state and the like are displayed on display device 27 of fault diagnostic system 2.

In step S30, it is judged whether or not there is any other faulty parts, and the process returns to step S24 if the judgment is positive, while the process terminates if it is negative.

Figure 11:
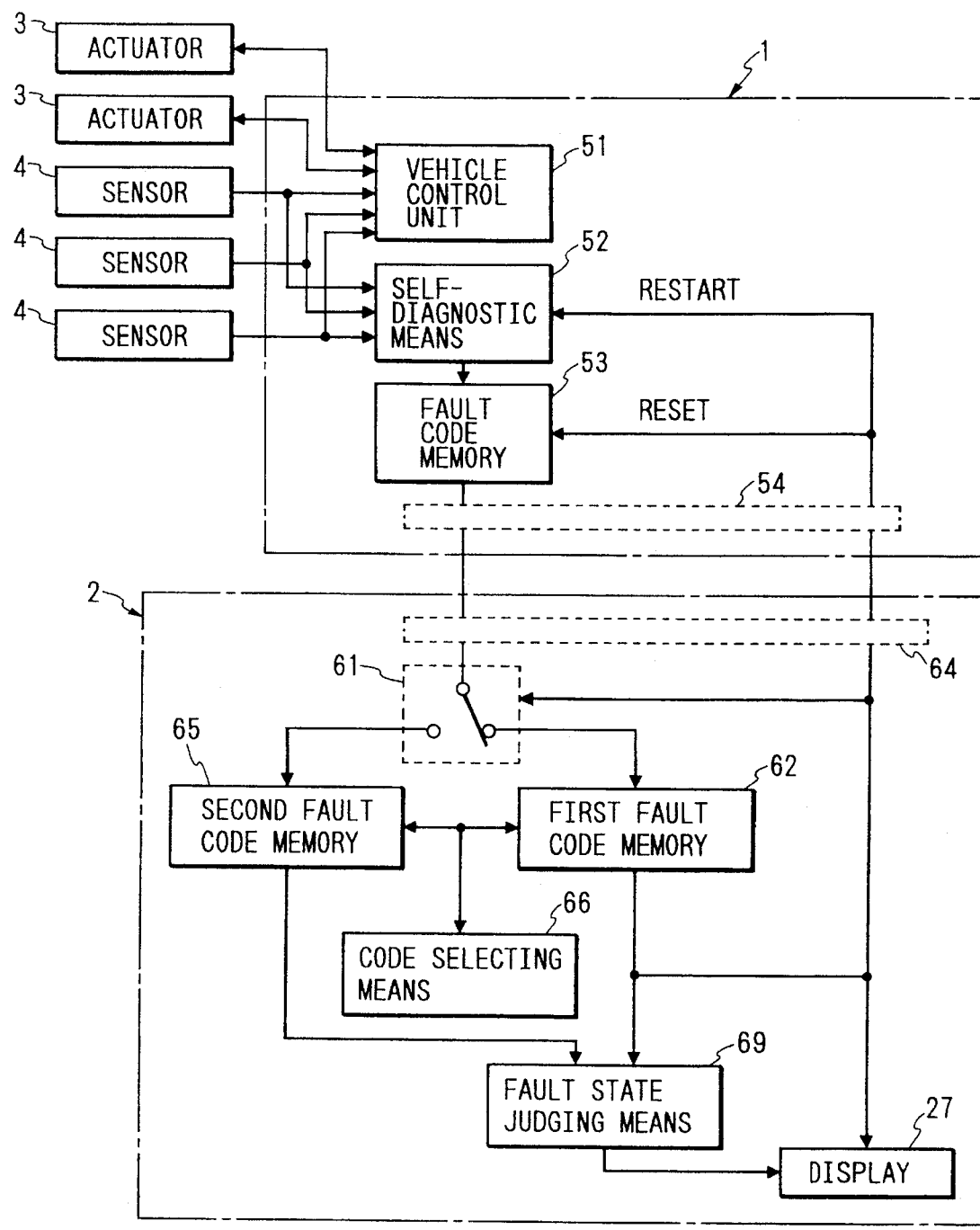
FIG. 11 is a functional block diagram for implementing the operation of FIG. 10.

FIG. 11 is a functional block diagram of the system which achieves the operation of the FIG. 10, and the same symbols as FIG. 2 represent the same or identical portions. Vehicle control unit 51 in ECU 1 controls actuators 3 with a predetermined procedure using the output signals of sensors 4. Self-diagnostic means 52 detects abnormality of sensors 4 when the control by vehicle control unit 51 is initiated and during the control as needed. When abnormality is detected, a fault code is stored in fault code storage means 53 in RAM 12.

Switching means 61 of fault diagnostic system 2 normally selects first fault code storage means 62 in RAM 22. When a fault diagnosis is performed, the fault code stored in fault code storage means 53 is transferred to first fault code storage means 62 via communication control means 54 and 64 and stored therein, and that fact and the name of the faulty sensor are displayed on display device 27 as necessary. Thereafter, switching means 61 is changed to the second fault code storage means 65 side in RAM 22, and fault code storage means 53 is reset and self-diagnostic means 52 is started again. By this, the fault detection of sensors by the self-diagnostic means is executed again, and if the fault is detected again, the fault code is stored in fault code storage means 53.

The fault code stored in fault code storage means 53 is now transferred to second fault code storage means 65 and stored therein. Code selecting means 66 sequentially extracts the fault codes of faulty sensors from first and second fault code storage means 62 and 65 and transfers them to fault state judging means 69, respectively.

The fault state judging means 69 executes the judgment in step S24 of FIG. 10 and transfers the result of judgment to display device 27.

Figure 12:
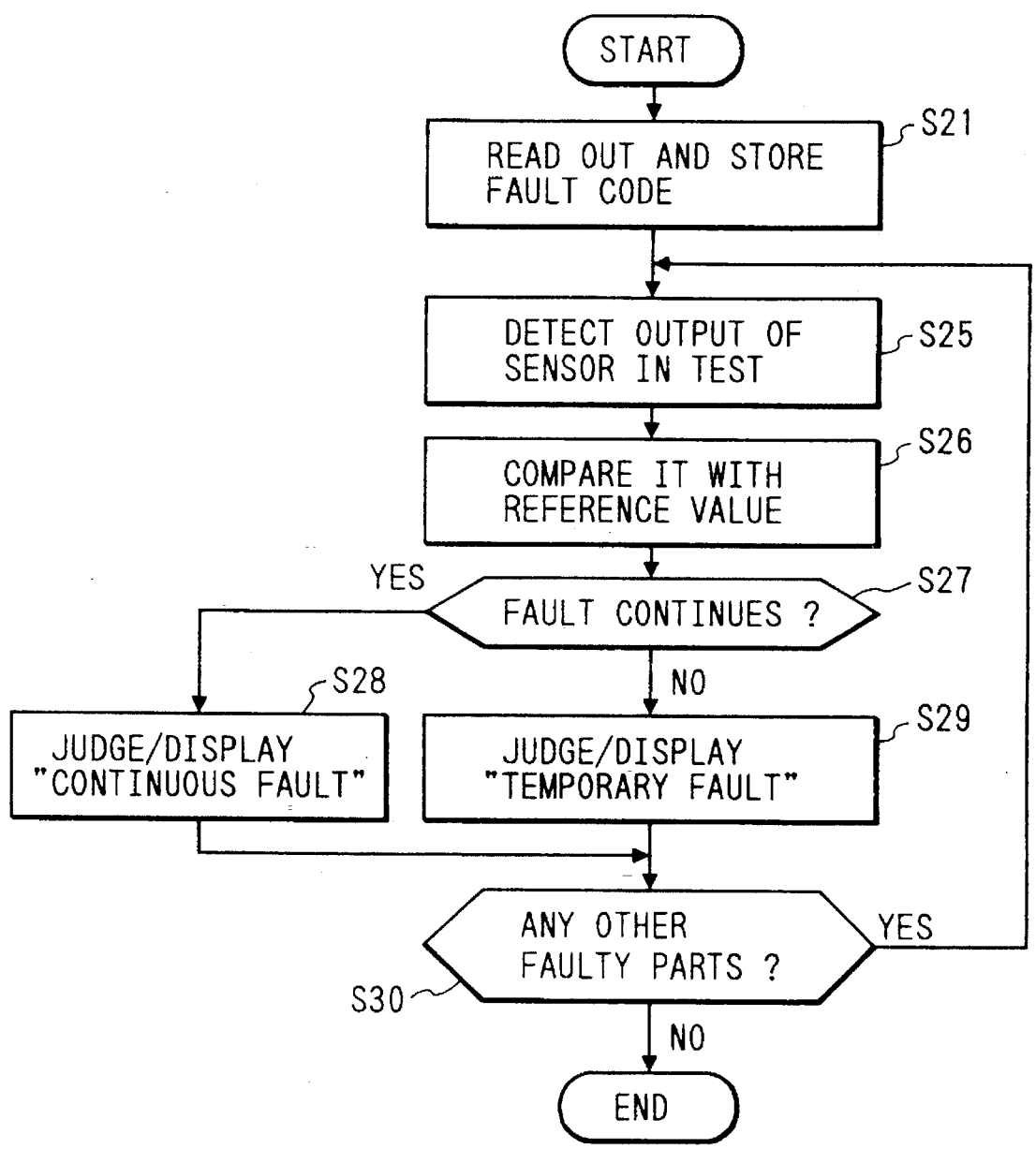
FIG. 12 is a flowchart showing the operation of still another embodiment of the present invention.

Judgment as to whether a fault is "continuous" or "transient (temporary)" may be made by the flowchart of FIG. 12 instead of the operation of FIG. 10. In FIG. 12, the same symbols as FIG. 10 represent the same or identical operations. When the fault code stored in RAM 12 of ECU 1 is stored in RAM 22 in fault diagnostic system 2 in step S21, the output value of the sensor corresponding to the stored fault code is detected by ECU 1 in step S25, and the detected output (voltage) value is compared with the reference value for fault judgment which has been previously stored in the fault diagnostic system 2 in step S26. The reference value is, for instance, the voltage value which is output when sensors 4 are normal, and if the output voltages of the plurality of sensors are different from each other, it is preset and stored for each sensor.

In step S27, it is judged whether the detected output value and the reference value are substantially in coincidence. If they are in coincidence, the fault is judged to be transient, and if they are not, it is judged to be continuous.

When the output voltage values of the sensors have a certain range, (1) the intermediate value of the range may be defined to be a reference value, and if the deviation of the sensor output voltage values from the reference value is greater than a predetermined value, it may be a judged to be short or a wire breaking, or (2) the lower and upper limit value of the range may be defined to be reference values, and if the output value is lower than the lower limit or exceeds the upper limit, it may be judged to be faulty (short or wire breaking).

Figure 13:
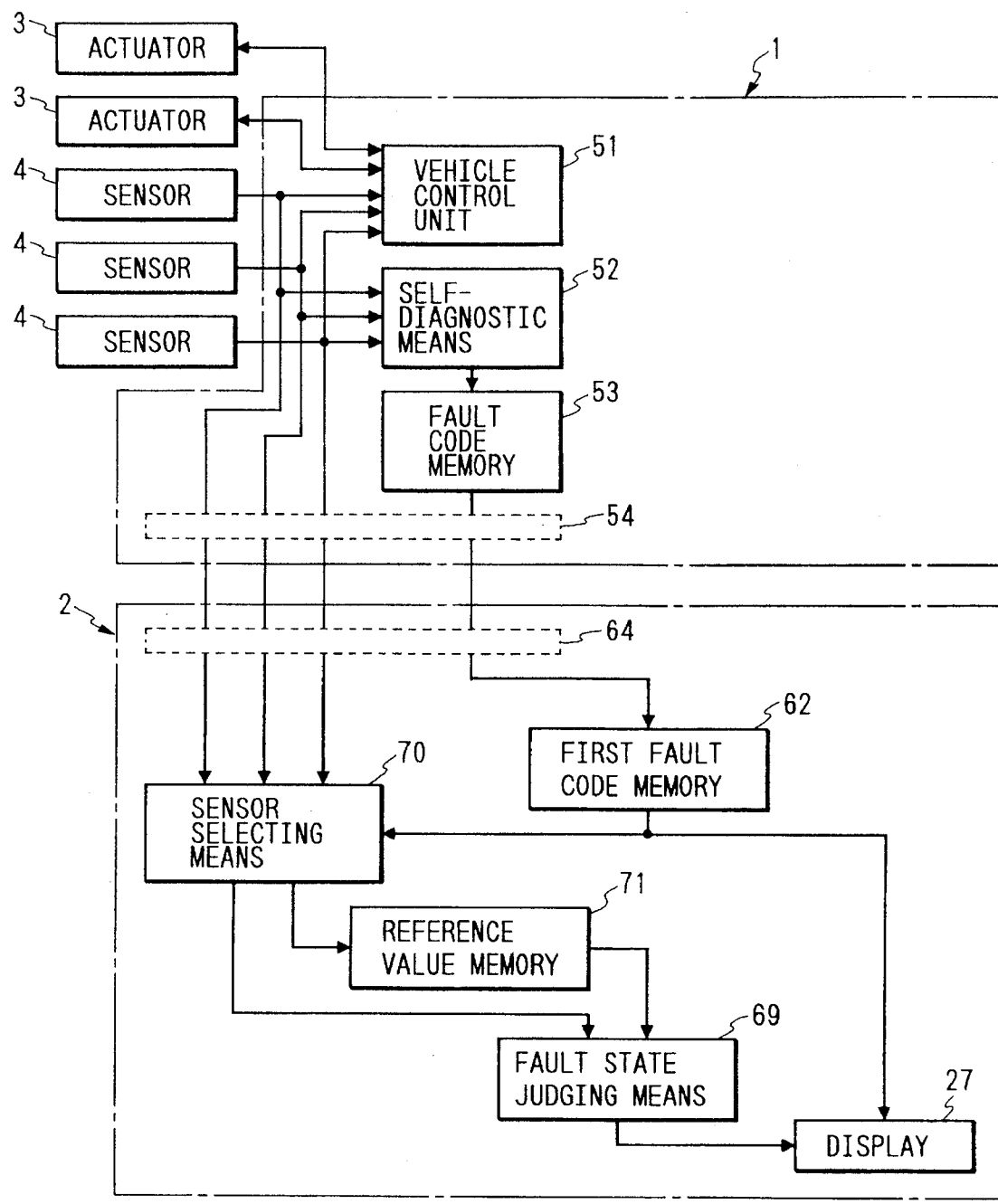
FIG. 13 is a functional block diagram for implementing the operation of FIG. 12.

FIG. 13 is a functional block diagram of the system for implementing the operation of FIG. 12. The hardware configuration for this may be the same as FIG. 2. When the fault code stored in fault code storage means 53 is transferred to and stored in first fault code storage means 62 via communication control means 54 and 64, sensor selecting means 70 is activated and the name of a faulty sensor is displayed on display device 27 as needed. In reference value storage means 71, the reference value of each sensor 4 as described above is stored. The sensor selecting means 70 takes in the output signal of a faulty sensor 4 through the communication control means 54 and 64 on the basis of the fault code stored in first fault code storage means 62, and outputs it to fault state judging means 69, and the means 70 reads out the reference value of the sensor 4 corresponding to the fault code and supplies it to the judging means 69. The fault state judging means 69 uses the output signal and reference value to execute the processings in steps S26 and S27.

Incidentally, after the fault code stored in fault code storage means 53 is transferred to first fault code storage means 62, fault code storage means 53 is reset as needed.

Figure 14:
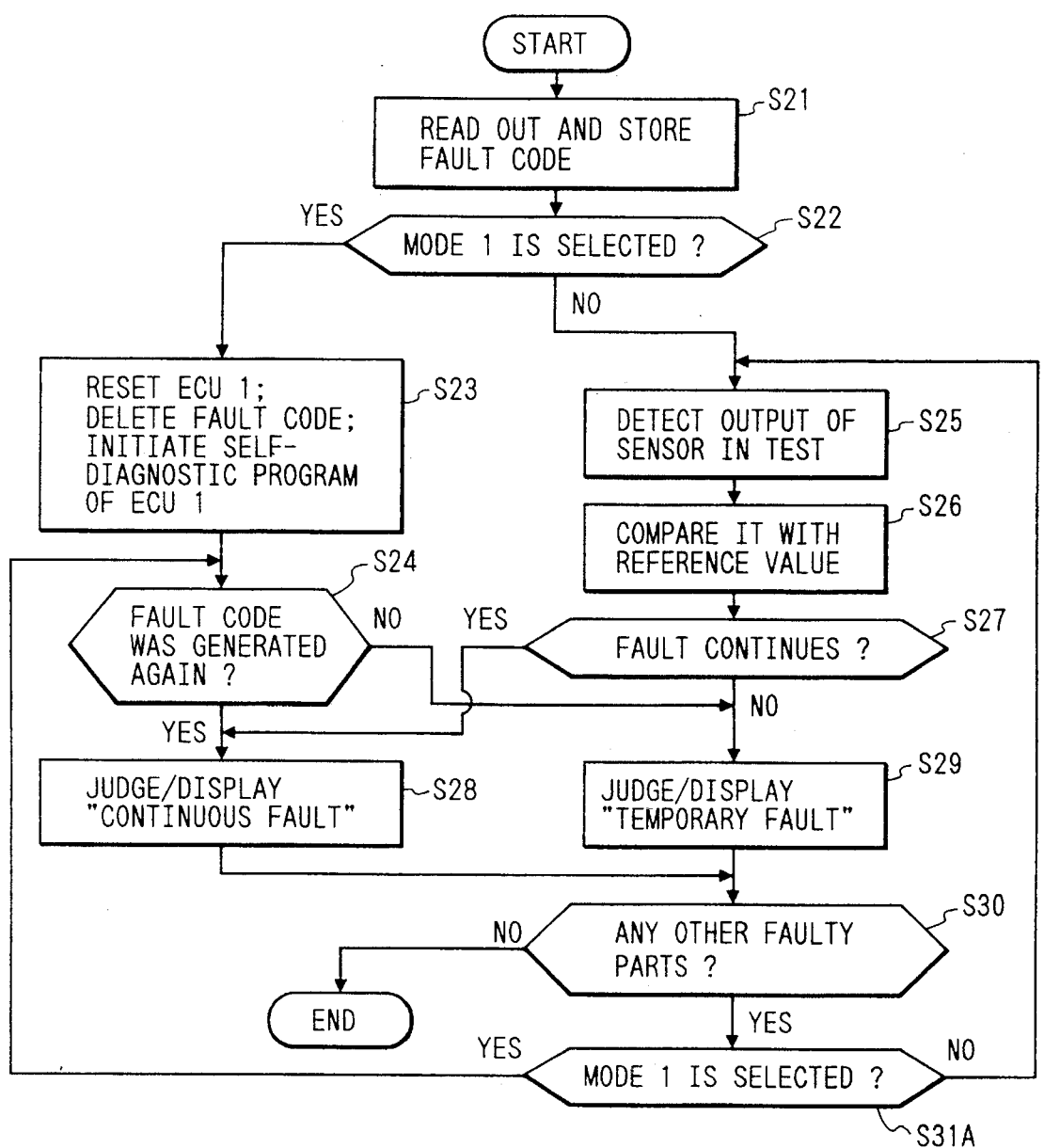
FIG. 14 is a flowchart showing the operation of still another embodiment of the present invention.

The third method for judging a continuous fault is described using the flowchart of FIG. 14 in which the same symbols as FIGS. 10 and 12 represent the same or identical processings. As obvious from the comparison with FIGS. 10 and 12, the procedure of FIG. 14 is adapted to freely select the procedure of either FIG. 10 or 12.

In step S22, one of the first mode (FIG. 10) and the second mode (FIG. 12) for judging fault characteristics is selected. Although the selection may be made by the operator of the fault diagnostic system 2, for instance, it may also be possible that, if the judgment of the contents of the fault codes read out in step S21 shows that all of the faulty sensors can be judged for their faults by the second mode, the second procedure is automatically selected, and if even one of the faulty sensors cannot be judged for a fault by the second procedure, the first procedure is automatically selected. The reason is that, since the second mode of simply reading the output signal of a sensor 4 needs a shorter judgment time than the first mode of initiating the self-diagnostic program of ECU 1, it is desirable to select the second mode first.

In step S30, if it is judged that there is a remaining faulty portion, the process returns to step S24 or step S25 according to the judgment in step S31A.

Figure 15:
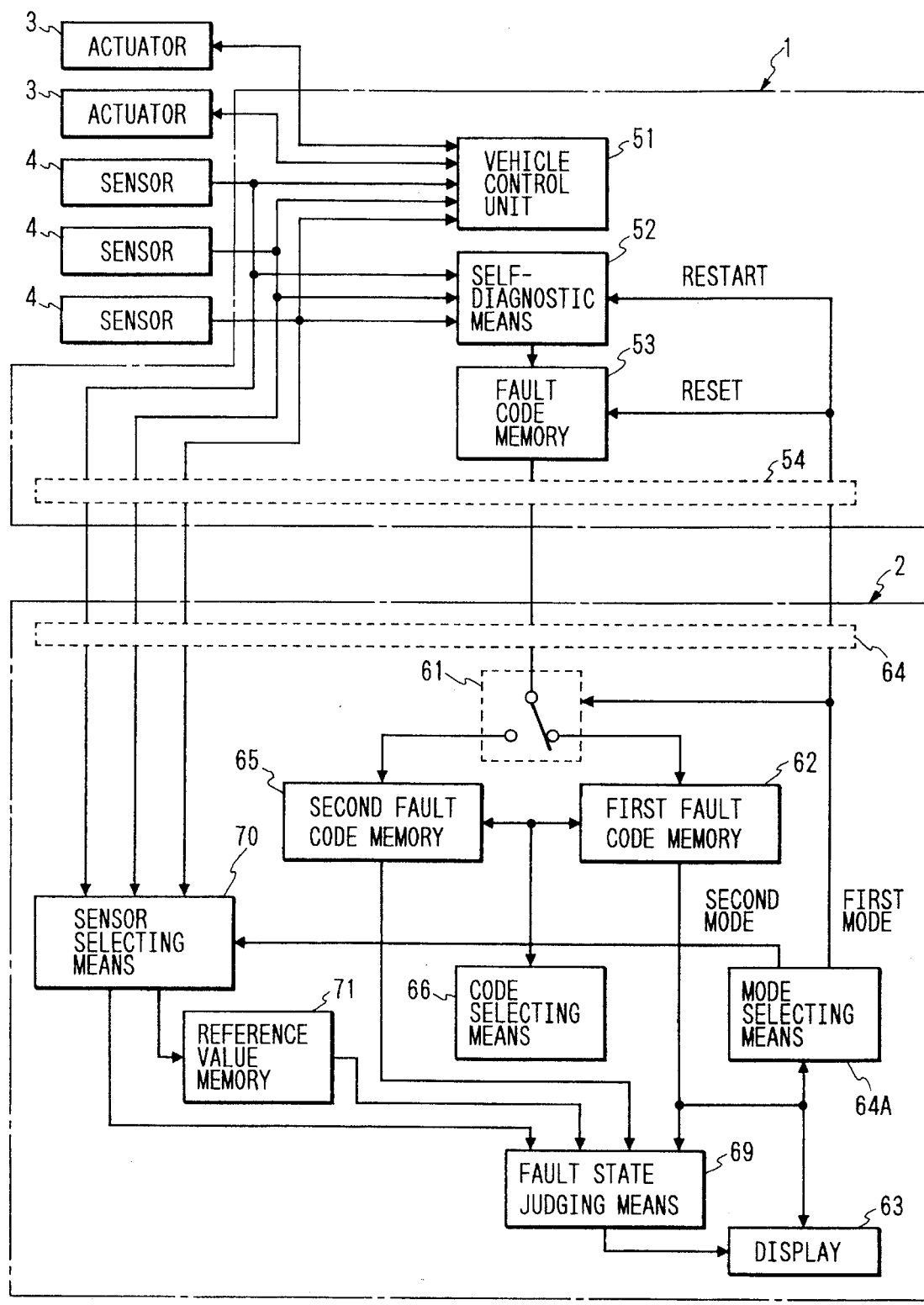
FIG. 15 is a functional block diagram for implementing the operation of FIG. 14.

FIG. 15 is a functional block diagram for implementing the operation of FIG. 14. When the fault code stored in fault code storage means 53 is transferred to first fault code storage means 62 and stored therein, mode selecting means 64A is activated. The mode selecting means 64A selects one of the first and second modes in the same manner as previously described in regard to step S2 of FIG. 14. In response to the selection of the first or second mode, a fault judgment is performed by a procedure as previously described in connection with FIG. 11 or 13. Since it is self-evident that FIG. 15 is equal to an integration of FIGS. 10 and 13, the explanation of it is omitted.

A judgment as to whether or not the fault of a sensor 4 is a continuous one has been described above, and it will be self-evident that a similar self-diagnosis or judgment can also be done on an actuator 3. If the actuator generates no output signal, it is only needed to provide, in self-diagnostic means 52, means for detecting the resistance value or the like of the actuator, judging means for judging whether or not the resistance value or the like is a normal value, and means for generating a fault code using the resistance value or the like if the resistance value or the like is abnormal.

The following effects are achieved by this embodiment.

(1) It can be judged with a relatively simple construction whether the fault of a sensor or the like detected in the electronic control unit is a continuous or temporary one, and the specific faulty portion can be identified by a proper approach according to the judgment result. If the self-diagnostic function of the electronic control unit is not initiated again, the fault judgment can be done faster. In addition, in response to a faulty sensor or the like detected by the self-diagnostic function of the ECU, the judging procedure of whether it is a continuous or temporary fault can be promptly and properly selected. In the above procedure, after it is judged whether the detected fault is continuous or temporary, it must be judged whether the fault is that of a sensor or actuator itself, or that of a connector or wire harness, to specifically identify the faulty portion. A specific technique for effectively performing this identification is described below.

Figure 16:
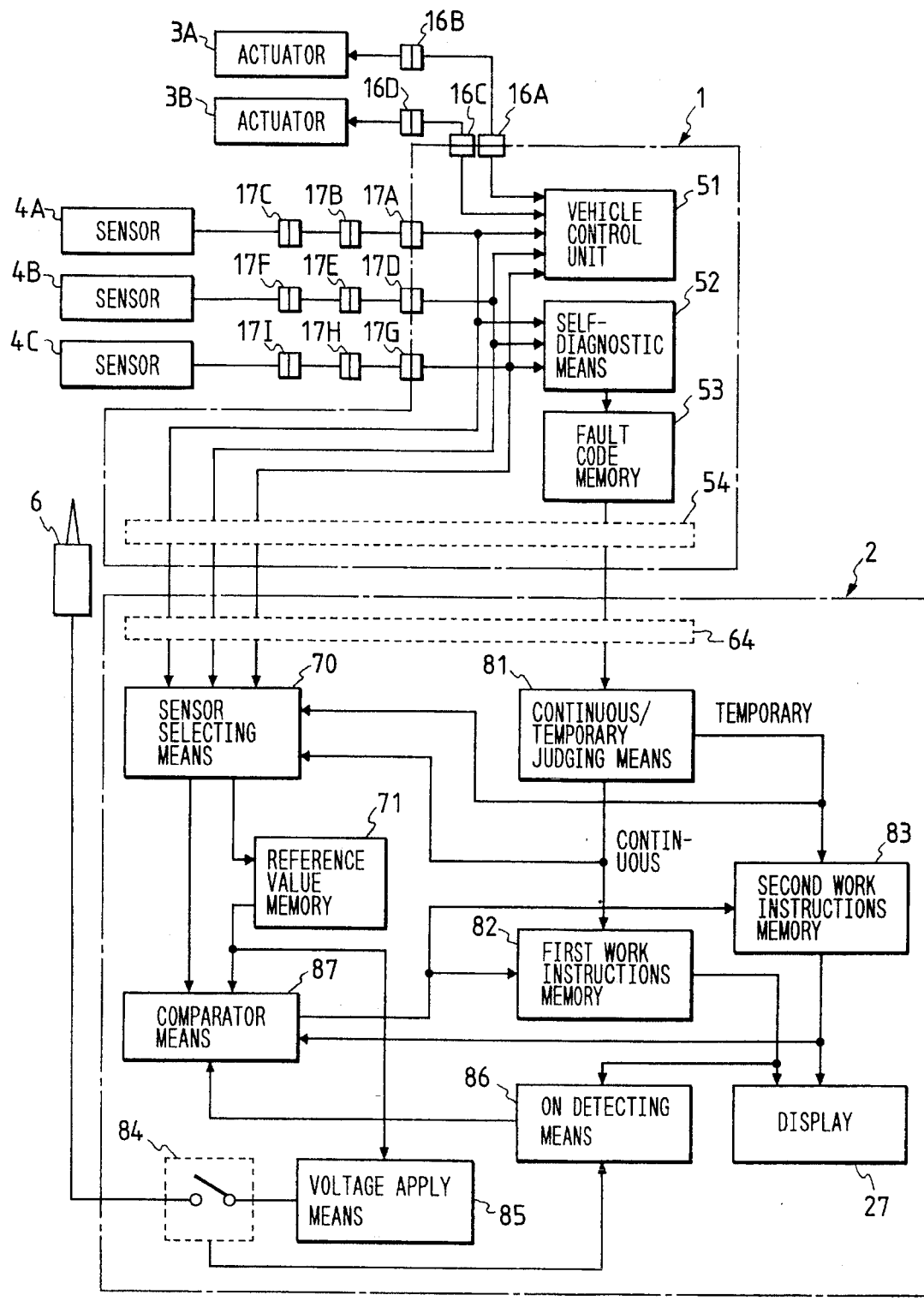
FIG. 16 is a functional block diagram of still another embodiment of the present invention.

In FIG. 2, actuators 3 and sensors 4 are shown to be connected to ECU 1 through only one connector 16 and 17, respectively, for simplification, but actually, they are often connected using a plurality of connectors as shown in FIG. 16.

Figure 17:
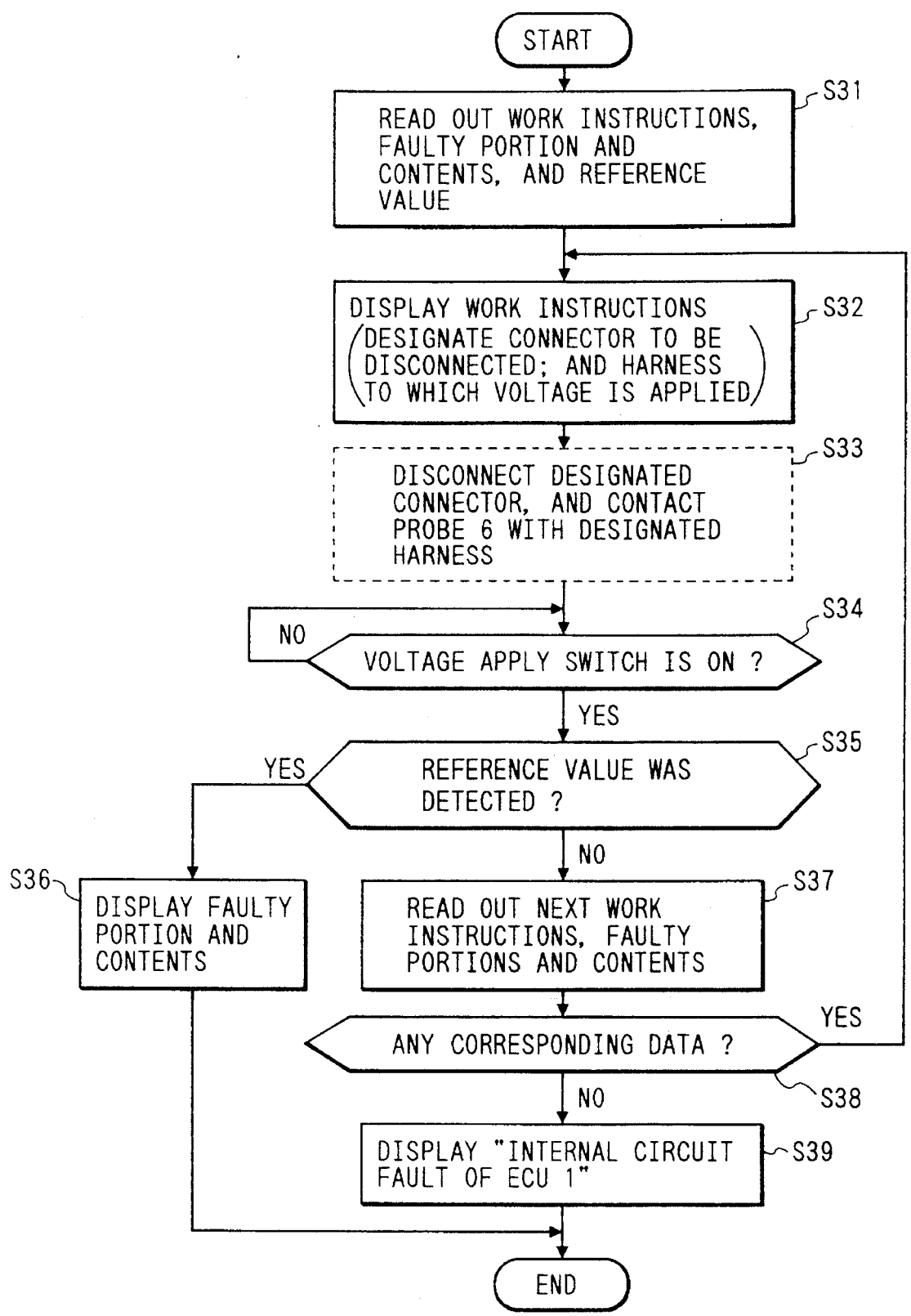
FIG. 17 is a detailed flowchart of an example of the continuous fault diagnostic program according to the present invention.

FIG. 17 is a flowchart of the continuous fault diagnostic operation, and a dashed-line block indicates a processing by an operator. In step S31, work instructions (in this case, a connector name and instructions for disconnecting the connector, and if the connector is to connect a plurality of wire harnesses, the color of the wire harness), and the faulty portion and state of fault corresponding to the work instructions are read out from first work instructions storage means 82 of the fault diagnostic system 2 (FIG. 16), and simultaneously the reference value of the sensors connected to the connector is read out from reference value storage means 71. The storage means 82 and 71 are provided in ROM 21.

In the example of FIG. 16, sensor 4A is connected to ECU 1 through three connectors 17A–17C. In such case, the work instruction is to disconnect a connector 17A, 17B or 17C, and the faulty portion and state of fault corresponding thereto is as shown in FIG. 18, for instance. In step S31, for instance, the connector nearest to sensor 4A (connector 17C of FIG. 16) is first selected as work instruction data, and the faulty portion and contents corresponding to the data are read out. The data of FIG. 18 is only the data relating to sensor 4A of FIG. 16, and similar data are stored in fault diagnostic system 2 for other sensors as well.

Further, if a connector is to connect a plurality of wire harnesses (or a plurality of sensors), the color of the wire harness to which the sensor corresponding to a fault code is connected is also stored as work instruction data. The data shown in FIG. 18 is only For exemplification, and data such as work instructions, faulty portions and their states are appropriately modified according to VIN, or ECU 1, sensor, actuator, etc. "Applied voltage detection" shows the judgment result of step S35 which will be later described, and "detected" and "undetected" correspond respectively to affirmation and denial of said judgment step of S35.

In step S32, the work instructions which were read out are displayed on display device 27. In step S33, the operator disconnects the indicated connector, and put test probe 6 in contact with the wire harness (if the connector connects a plurality of wire harnesses, the wire harness of the color specified by the work instructions) of the connector near to ECU 1. In step S34, it is judged whether or not the voltage apply switch on keyboard 26 of fault diagnostic system 2 has been turned on. If the switch has been turned on, the voltage of the reference value read out in step S31 is output from the test probe 6 and applied to the selected connector.

In step S35, it is judged whether or not a voltage signal substantially equal to the reference value has been detected. If so, in step S36, the faulty portion and contents (FIG. 18) read out in the step S31 are displayed, and this process terminates. That is, if connector 17C is selected as work instructions and the judgment in step S35 immediately after this process is positive, "internal wire breaking" is displayed, as seen from FIG. 18.

If a voltage signal substantially equal to the reference value has not been detected in step S35, in the following step S37, the next work instructions (for instance, instructions to disconnect the connector next to the already indicated connector and nearer to ECU 1, namely, in this instance, connector 17B) and the faulty portion and its state corresponding to the work instructions are read out. Since the reading of the reference value has been executed in step S31, it must not be done in the step S37.

In step S38, it is judged whether or not new data has been read out in step S37, and if the new data has been read out (that is, if there is another connector to be disconnected), the process returns to step S32, and if data has not been read out (for instance, if the connector nearest to ECU 1, or connector 17A provided in ECU 1 has already been disconnected), for instance, "internal circuit failure of ECU 1" is displayed.

FIG. 19 is a flowchart of the temporary fault diagnostic program. In that figure, the same symbols as FIG. 17 represent the same or identical portions, and the dashed-line block represents a processing by an operator. In step S41, from second work instructions storage unit 83 and reference value storage means 71 in ROM 21 of the fault diagnostic system 2, work instructions (in this case, a connector name and instructions to shake the connector), the faulty portion and its state corresponding to the work instructions, and the reference value (range) of the sensor connected to the connector are read out. An example of the work instructions in this case and the faulty portions and fault states corresponding to the work instructions is shown in FIG. 20.

In the example of FIG. 20, the work instructions to be read out first are to shake connector 17C. "Sensor output voltage" represents the judgment result of step S45 of FIG. 19, and "abnormal" and "normal" correspond to a positive and a negative judgment, respectively.

In step S42, the work instructions which have been read out are displayed on display device 27. In step S43, the operator of the fault diagnostic system 2 shakes the indicated connector. In step S44, the sensor output signal (the output signal of the sensor connected to the shaken connector) detected through ECU 1 is compared with the reference value read out in step S41.

In step S45, it is judged whether or not the sensor output signal is abnormal, that is, it is judged whether or not the sensor output signal has deviated even momentarily from the reference value (or range) in process of the comparison in step S44. If abnormality (short or wire breaking) is detected, the process moves to step S36, and if abnormality is not detected, the process moves to step S37.

FIG. 16 is a functional block diagram of the system for implementing the process of FIG. 17 or 19. In FIG. 16, actuators 3A and 3B are connected to ECU 1 by connectors 16A–16D, and sensors 4A–4C are connected to ECU 1 by connectors 17A–17I, respectively.

Continuous/temporary fault judging means 81 judges whether the line fault at the sensor side judged by self-diagnostic means 52 is continuous or temporary, as described above.

In first work instructions storage means 82, work instructions data including the work instructions and the faulty portions and fault states corresponding to the work instructions which were previously described with reference to step S31 of FIG. 17 are stored correspondingly to sensors 4A–4C and actuators 3A and 3B. Similarly, in second work instructions storage means 83, work instructions data which were previously described with reference to step S41 of FIG. 19 are stored correspondingly to the respective sensors 4A–4C and actuators 3A and 3B.

If a judgment of continuous fault is provided by the continuous/temporary fault judging means 81, the output signal line of the faulty sensor is selected by sensor selecting means 70 and the reference value of the sensor is output by reference value storage means 71 to comparator means 87, and a voltage corresponding to the reference value is output from voltage apply means 85 to test probe 6 via switching means 84 (normally opened). The work instructions of the work instructions data corresponding to the faulty sensor is read out from first work instructions storage means 82 and output to display device 27, and ON-detecting means 86 is initiated.

If the ON-detecting means 86 detects the ON-state of switching means 84 (that is, if the operator disconnects the specified connector, put the electrode of test probe 6 in contact with the corresponding wire harness of the connector, and closes switching means 84), comparator means 87 is initiated. If the reference value output from reference value storage means 71 is substantially equal to the output signal of ECU 1 which was input to the comparator means 87 through communication control means 54 and 64 and sensor selecting means 70 (that is, if a voltage signal substantially equal to the reference value output from test probe 6 was input to comparator means 87 through the disconnected connector and ECU 1), the faulty portion and its state corresponding to the work instructions displayed on display device 27 are output to display device 27. By this, the faulty portion of one sensor can be identified.

If it is judged by comparator means 87 that the reference value and the output signal are not equal, first work instructions storage means 82 is initiated to output the next work instructions to display device 27 and ON-detecting means 86 is initiated again. And a process as described above is repeated again.

If a judgment of transient fault is provided by the continuous/temporary fault judging means 81, sensor selecting means 70 is activated and the output signal line of the faulty sensor is selected, and the reference value of the sensor is output from reference value storage means 71 to comparator means 87. The work instructions of the work instructions data corresponding to the faulty sensor are read out from second work instructions storage means 83 and output to display device 27, and comparator means 87 is initiated.

If the output signal of the specified connector displayed on display device 27 takes even momentarily a value (abnormal value) deviating from the reference value when the operator shakes the connector, comparator means 87 outputs the faulty portion and its state corresponding to the work instructions displayed on display device 27 to display device 27. By this, the faulty portion of one sensor can be identified.

If the output signal does not take a value deviating from the reference value or range, the comparator means 87 activates second work instructions storage means 83 to cause it to output the next work instructions to display device 27. And a process as described above is repeated again.

When the faulty portion of a sensor could be identified in response to a continuous or temporary fault, the faulty portion of the next sensor is identified.

The continuous/temporary fault judging procedures shown in FIGS. 16–20 are merely for exemplifications, and any other approach may be used. Description has been made of the continuous/temporary judgment of a sensor failure, but it must be obvious to those skilled in the art that similar detection and judgment for actuators are also possible. Depending on whether the actuator failure is continuous or temporary, the specific faulty portion can be identified.

Now, the fault diagnostic processes of several parts are described using concrete examples. First, for a process example in which sensor 4A connected to ECU 1 through a plurality of connectors 17A–17C as shown in FIG. 16 is a water temperature sensor and the faulty portion is identified based on fault information when the fault of the sensor is detected, description will be made with reference to the flowcharts shown in FIGS. 21 and 22. These processes are performed with the fault diagnostic system 2 being connected to the ECU 1 of a vehicle. In each flowchart, the processings surrounded by dashed lines represent manual processings by an operator of the fault diagnostic system 2.

When the selection program of fault diagnostic system 2 is initiated, an operation mode selection is made in step S51, and the process goes to step S52 if a fault analysis mode for identifying the fault portion is selected. On the other hand, the process advances to step S55 if a repair verification mode for verifying the normal operation of the repaired portion is selected.

In step S52, fault information including a fault code and fault data is automatically read out from fault information storage means 53 of ECU 1 and stored in RAM 22 in fault diagnostic system 2. The fault code is a part identification code for identifying the fault portion, and fault data is, for instance, the output signal (voltage value) of a sensor. If the system voltage input to the sensor is, for instance, d.c. 5 [V], the output voltage of the sensor is, for instance, 0.05–4.95 [V] if the sensor is normal, and it is lower than 0.05 [V] or higher than 4.95 [V] if the sensor is short-circuited to the ground or broken, respectively. In the reading out, the name of a faulty sensor and the like may be displayed on display device 27.

In step S53, the optimum fault diagnostic program corresponding to the fault code is selected from ROM 21 of fault diagnostic system 2. The fault diagnostic program provides work instructions for identifying a faulty portion, the faulty portion and faulty state corresponding to the work instructions, and a reference value serving as the criterion for judging the fault. The work instructions are a checking procedure, checking technique and the like for identifying the faulty portion, and in tills embodiment, they correspond to a connector name and the instructions to disconnect the connector, and in addition, to a wire harness color if the connector is to connect a plurality of wire harnesses. The faulty portions and fault states corresponding to them are as shown in FIG. 18, for example.

Figure 22:
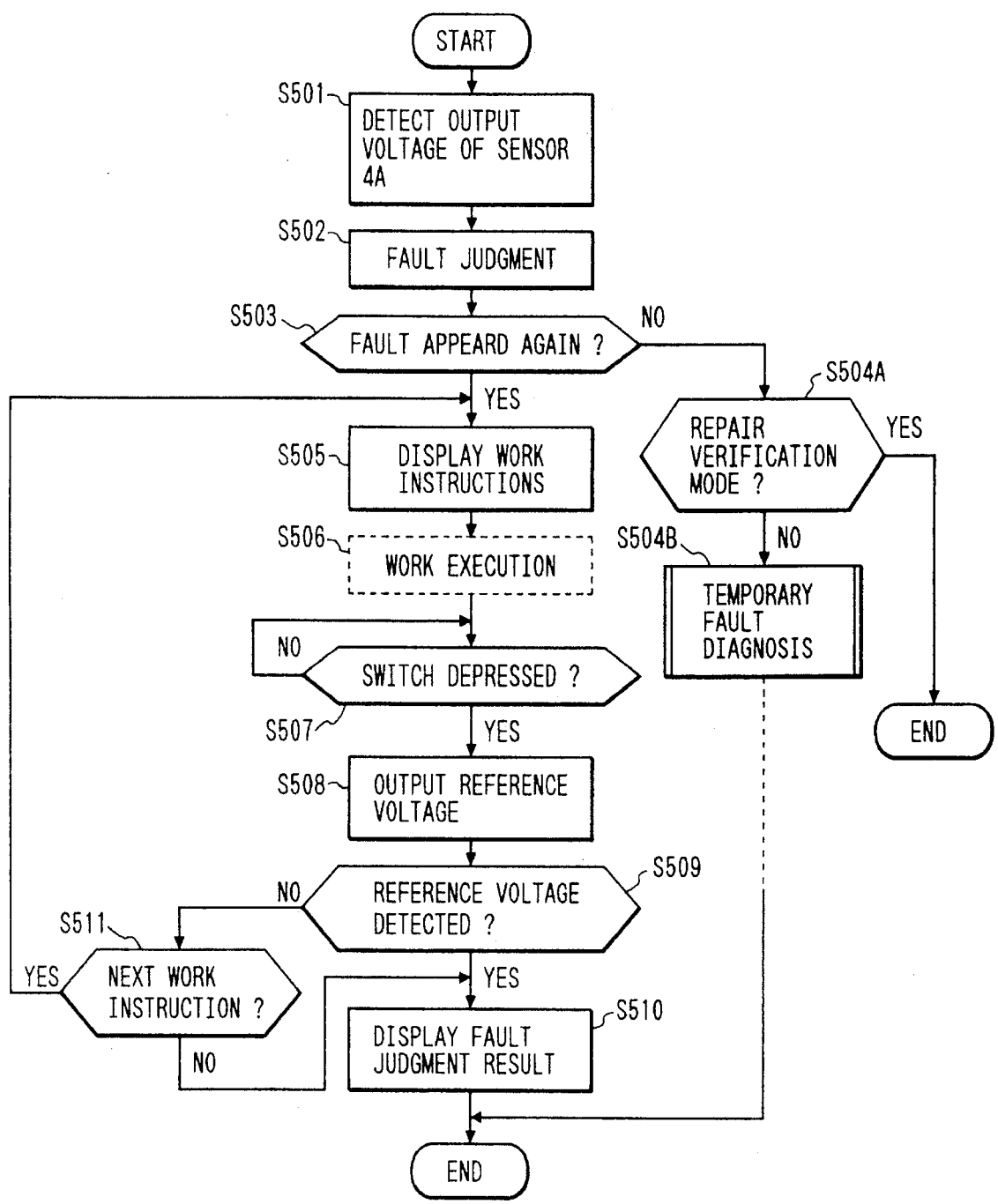
FIG. 22 is a detailed flowchart showing the method for identifying faulty portions according to the present invention.

In step S54, as detailed below, the fault diagnostic program selected according to a fault code is initiated to perform a fault diagnosis. FIG. 22 is a flowchart of an example of the fault diagnostic program.

In step S501, the instructions to again detect the output voltage of sensor 4A to be diagnosed are output from the fault diagnostic system 2 to ECU 1, and the output voltage of sensor 4A is detected by ECU 1. In step S502, ECU 1 again makes a fault judgment on the basis of the output voltage of sensor 4A and outputs the judgment result to fault diagnostic system 2.

In step S503, it is judged whether or not the fault appears again. When the fault does not appear again, it is judged that the process is not in repair verification mode in step S504A, then the temporary fault diagnostic program as shown in FIG. 19 is executed in step S504B. If no abnormality is found in step S504B, "no fault reproduction" is displayed on display device 27 and the process terminates.

If the fault appears again in step S503, for instance, work instructions to disconnect connector 17C nearest to sensor 4A and to put test probe 6 in contact with a certain wire harness are displayed.

In step S506, the repairman disconnects the specified connector 17C and puts test probe 6 in contact with the wire harness connected to the connector (the wire harness of the color specified in the work instructions if the connector connects a plurality of wire harnesses).

In step S507, it is judged whether or not the voltage apply switch 84 (FIG. 16) on keyboard 26 of fault diagnostic system 2 has been depressed. If voltage apply switch 84 is depressed, a voltage responsive to the reference value is output from test probe 6 in step S508.

In step S509, it is judged by fault diagnostic system 2 whether or not a voltage substantially equal to the reference value has been detected by ECU 1. If it has been detected, the faulty portion and fault state corresponding to the work instructions are displayed on display device 27 and the process terminates in step S510. That is, as obvious from FIG. 18, a display that the faulty portion is sensor 4A and the fault state is "wire breaking" is provided.

In step S509, if no voltage substantially equal to the reference value has been detected, in step S511, it is judged whether or not the next work instructions (for instance, instructions to disconnect connector 17B being next to the already specified connector 17C and nearer to ECU 1) are registered. If the judgment result is positive, the process returns to step S505 where new work instructions (to disconnect connector 17B) are displayed to repeat the above described process. If the judgment is negative, that is, if the connector nearest to ECU 1, or the connector provided in ECU 1 has already been disconnected, an internal circuit failure of ECU 1 is judged as shown in FIG. 18 and a display of the judgement result is provided in step S510 and the fault diagnosis is terminated.

Figure 21:
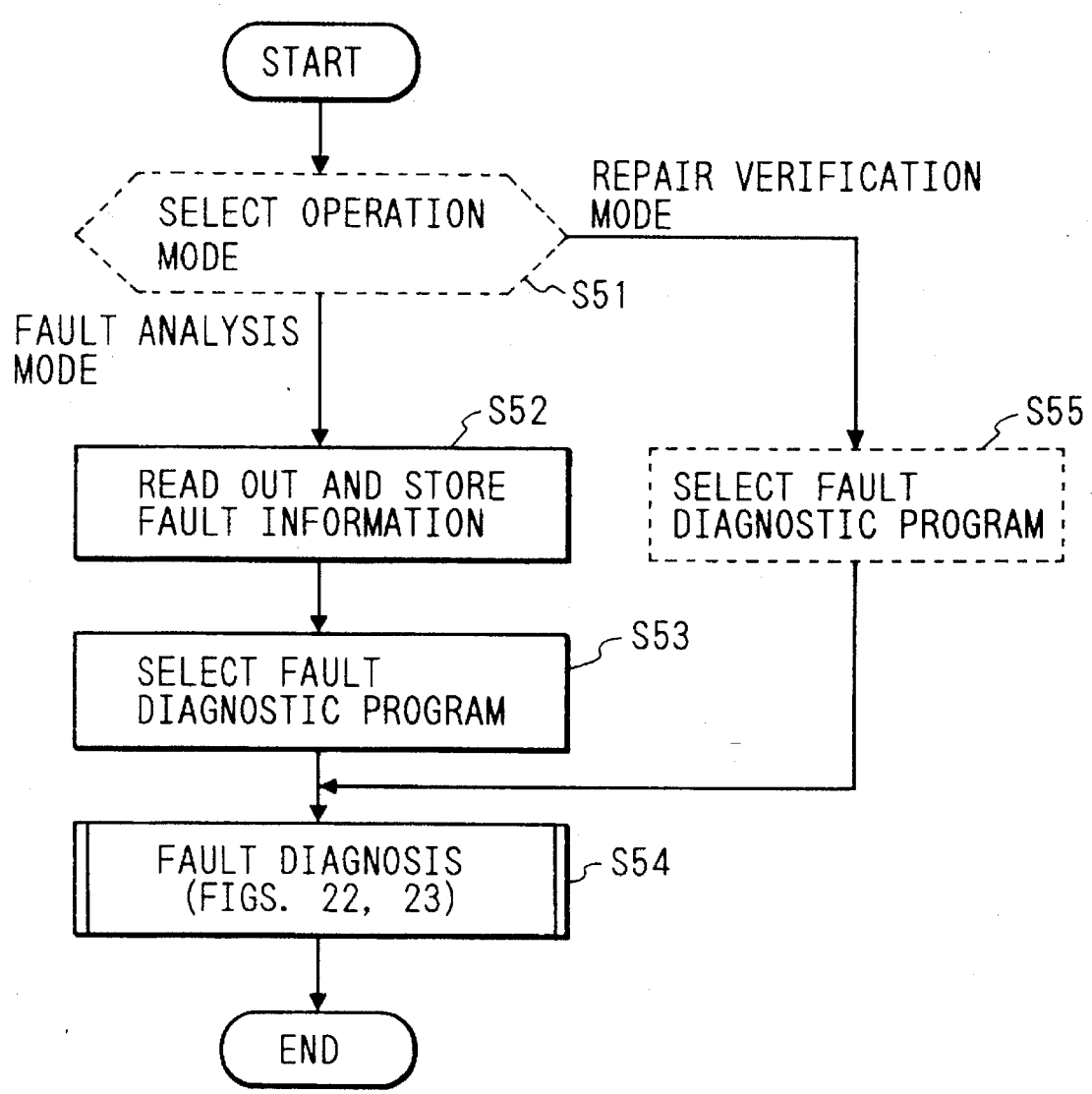
FIG. 21 is a general flowchart showing the method for identifying faulty portions according to the present invention.

On the other hand, if the repair verification mode is selected in step S51 of FIG. 21, a fault diagnostic program for verifying the operation of the already repaired portion is selected by the operator in step S55. If the repair verification of the sensor 4A is to be performed, the fault diagnostic program (FIG. 22) utilized for the fault diagnosis of the same sensor will be selected.

In step S54, the processings in steps S501 to S503 of the program are performed as described above, and if "no fault reproduction" is confirmed in step S503, it is judged that the repair of fault is completed, and the process is terminated through step S504A.

Although the method for identifying a faulty portion has been described above by taking the fault of a sensor as an example, the faulty portion can be identified in a manner similar to the above description even if an actuator fails.

The fault diagnostic process shown in FIG. 22 is useful when a faulty portion is identified on the basis of the fault information of a part, for instance, a "water temperature sensor", which operates even in a vehicle stop condition. In this case, since the fault can relatively easily be reproduced, the faulty portion can relatively easily be identified by fault diagnosis while observing the reproduced fault state.

However, if a faulty portion is identified on the basis of fault information which is obtained by a relatively difficult fault diagnosis, for instance, fault information of a part which operates only when a vehicle to be diagnosed is in the running state, such as a "speed indicator" or a "valve" which varies in opening/closing timing according to the travel speed of the vehicle, it is difficult to reproduce the fault and thus the approach of FIG. 22 is difficult to apply.

In FIG. 16, if sensor 4A connected to ECU 1 through a plurality of connectors 17A–17C is a speed sensor and its fault is detected, the main flow of the procedure for identifying the fault portion on the basis of the fault code may be the same as FIG. 21. The details of fault diagnostic process S54 are described with reference to the flowchart of FIG. 23.

The fault data in this case is, for instance, the number of pulses per unit time output from sensor 4A. If the sensor is normal, the number of its output pulses is assumed to be 10–1800, and if the sensor is faulty, a value outside the above range is detected. The fault diagnosis of speed sensor 4A is preferably done under a condition where sensor 4A is outputting pulses as in the traveling of the vehicle, but it is difficult for the vehicle to travel with the fault diagnostic system being connected. The fault diagnostic program of this embodiment provides an alternate diagnostic procedure, which can make the diagnosis by simulating the same condition as the traveling of the vehicle without requiring the actual traveling.

Figure 23A:
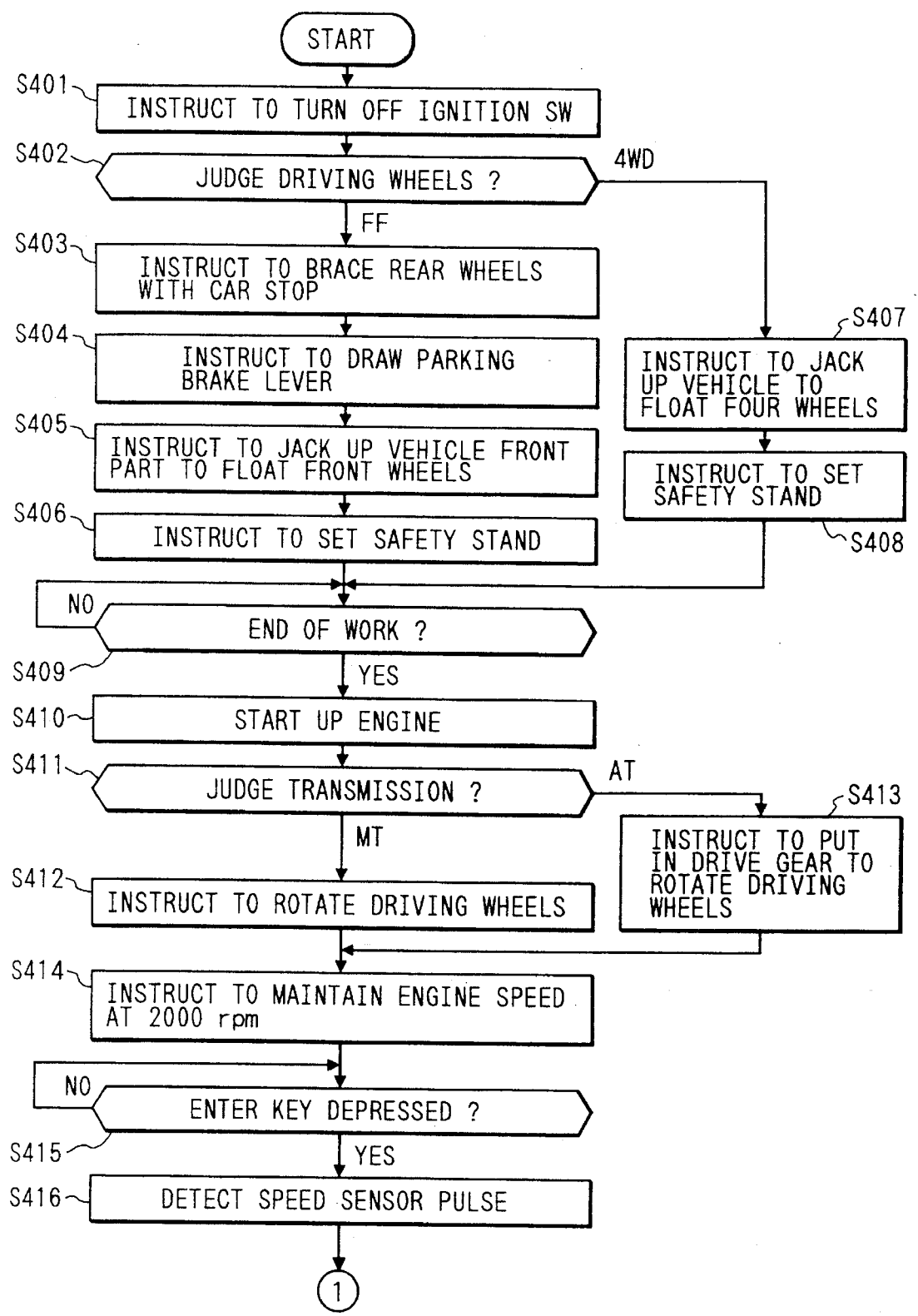
FIGS. 23A and 23B taken together are a detailed flowchart showing another example of the method for identifying faulty portions according to the present invention.
Figure 23B:
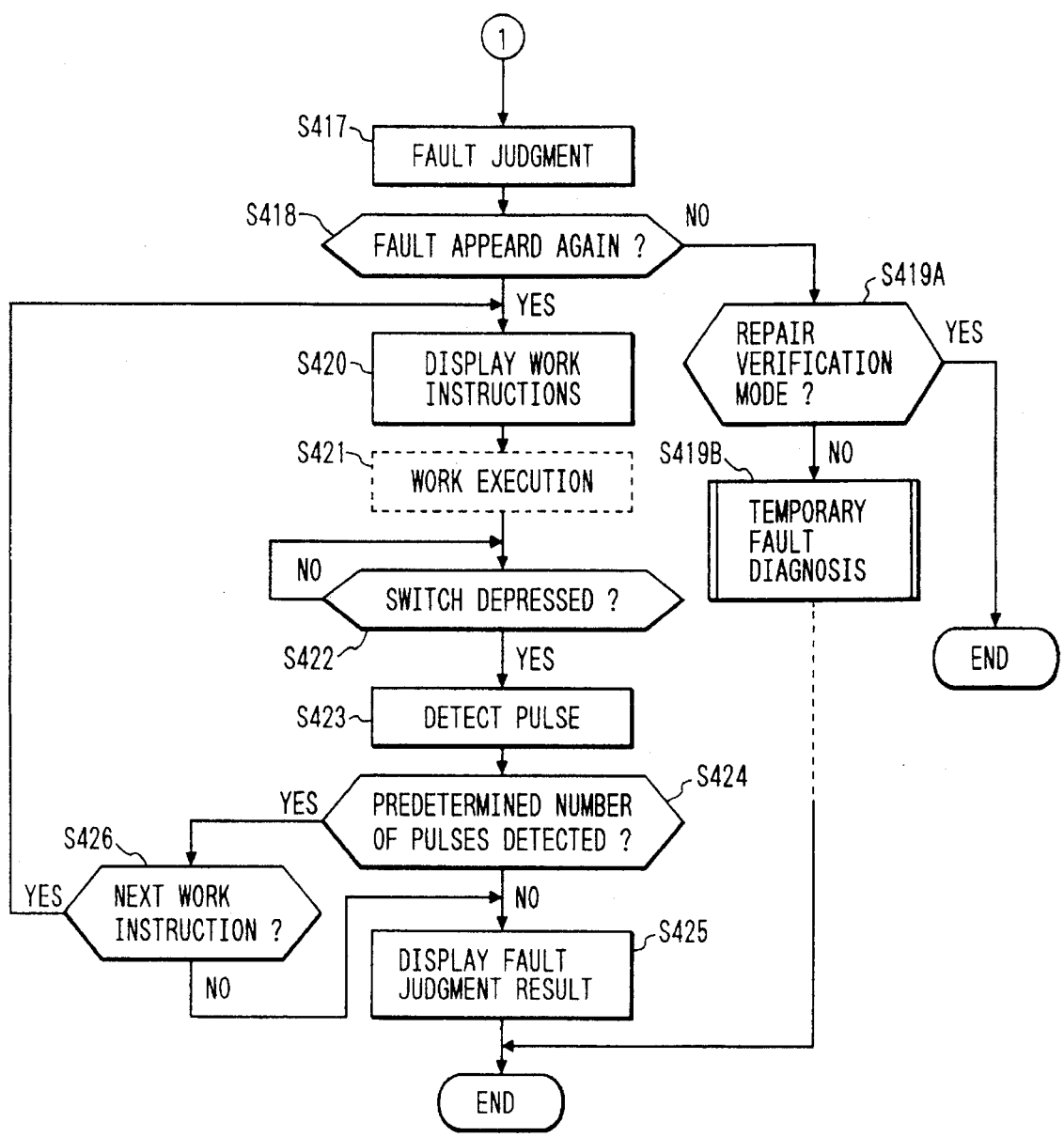

The fault diagnostic program of FIG. 23 provides a preliminary work for the fault diagnosis, work instructions for identifying a faulty portion, the fault portion and fault state corresponding to the work instructions, and a reference value which is the judgment criterion for fault.

The work instructions are a checking procedure, a checking technique and the like for identifying a faulty portion, and in this embodiment, they correspond to a connector name and instructions to disconnect the connector of said name, and if the connector is to connect a plurality of wire harnesses, to color of a wire harness. An example of the faulty portion and fault state corresponding to them is shown, for instance, in FIG. 24. "Pulse detection status" in the figure represents the judgment result in the later described step S424, "detected" and "undetected" represent a positive judgment and a negative judgment of the same step, respectively.

If the fault diagnostic program selected in step S53 of FIG. 21 is initiated in step S54, work instructions to turn off the ignition switch for simulating the traveling state are displayed on display device 27 in step S401.

In step S402, the type of the driving wheels is determined, and if the vehicle is of a front wheel drive (FF) type, the process advances to step S403, and if a four wheel drive (4 WD) type, the process skips to step S407.

In step S403, work instructions to brace the rear wheels with a car stop are displayed, and in step S404, work instructions to put on the parking brake are provided.

In step S405, work instructions to jack up the front part of the vehicle to hold up the front wheels are displayed, and work instructions to set the safety stand to fix the vehicle are displayed in step S406.

On the other hand, for a four wheel drive (4 WD) vehicle, work instructions to jack tip the vehicle to hold up all the four wheels are displayed in step S407, and work instructions to set the safety stand are displayed in step S408. Although not shown, for a rear wheel drive vehicle, after the front wheels first are locked and the rear wheels are held up, the safety stand is placed as in steps S403–406.

In step S409, it is judged whether or not all the above-mentioned work instructions have been performed. The judgment on completeness of a work may be made individual work instructions. When work instructions terminate and the repairman depresses the enter key on keyboard 26, work instructions to start up the engine are displayed in step S410.

In step S411, the transmission type is determined, and the process advances to step S412 for a manual transmission (MT) vehicle, while to step S413 for an automatic (AT) transmission vehicle.

In step S412, for instance, work instructions to put the transmission in low gear to rotate the driving wheels are displayed, and in step S413, work instructions to put the transmission in drive gear to rotate the driving wheels are displayed.

In step S414, work instructions to maintain the engine speed at a specific value (for instance, 2000 rpm) are displayed, and if the repairman presses the enter key at the engine speed of 2000 rpm and this key operation is detected in step S415, instructions to again detect the pulse signal of speed sensor 4A to be diagnosed are output from the fault diagnostic system 2 to ECU 1, and the pulse signal of sensor 4A is detected by ECU 1 in step S416.

In step S417, ECU 1 performs a fault judgment on the basis of the number of output pulses of sensor 4A, and transfers the judgment result to fault diagnostic system 2. In step S418, it is judged whether or not the fault is reproduced, and if the fault is not reproduced, it is judged that the process is not in repair verification mode in step S419A, and then the above described temporary fault diagnosis is done in step S419B. If the fault still does not reappear, a display to that effect is provided on display device 27 and the process terminates.

If the fault is reproduced, in step S420, for instance, work instructions are displayed for disconnecting connector (FIG. 16) nearest to sensor 4A, and putting test probe 6 in contact with a specific wire harness connected to sensor 4A while maintaining the engine speed at 2000 rpm.

In step S421, the repairman disconnects the specified connector 17C, and puts test probe 6 in contact with the wire harness connected to the connector (if the connector connects a plurality of wire harnesses, the wire harness of the color specified by the work instructions).

In step S422, it is judged whether or not the pulse detection switch (not shown) on keyboard 26 of fault diagnostic system 2 was depressed. If the pulse detection switch is depressed, a pulse signal through test probe 6 is detected in step S423.

In step S424, it is judged whether or not the number of pulses substantially equal to the reference value was detected. If not, in step S425, the faulty portion and fault state corresponding to the work instructions are displayed on display device 27 and the process terminates. That is, a display to the effect that the faulty portion is sensor 4A and the faulty state is "wire breaking" is provided.

If the number of pulses substantially equal to the reference value is detected in step S424, it is judged in step S426 whether or not the next work instructions are registered, and if the work instructions are registered (that is, if there is another connector to be disconnected), the process returns to step S420, where new work instructions are displayed, for instance, for reconnecting the conector 17C diagnosed by the previous instructions and disconnecting the next connector 17B nearer to ECU 1, and the above process is repeated.

If no work instruction are registered, that is, if connector 17A nearest to ECU 1 in FIG. 16, or the connector provided in ECU 1 has already been disconnected, a judgment of "internal circuit fault of ECU 1" is made, and a display to that effect is provided in step S425 and the fault diagnosis terminates.

On the other hand, if the repair verification mode is selected in the step S51, the fault diagnostic program utilized for the fault diagnosis of the sensor is selected as described above. If a display is finally provided to the effect that no fault is reproduced, it is judges that the fault repair is complete.

As obvious from the above description, in accordance with the present embodiment, since the fault diagnostic system itself judged whether or not it is necessary to drive the engine for the fault diagnosis and the optimum alternate work procedure is given from the diagnostic system to the repairman, the faulty portion can easily be identified.

Description is now made on further embodiments, in which, to diagnose the failure of a portion for which it is difficult to quantitatively describe the faulty portion and fault state, a known state is created by a known signal input from the outside, the quantitative checking result obtained at this point is compared with the result expected from the known state, and the fault diagnosis of each portion is performed on the basis of the comparison result.

When a signal for putting the subject portion to be diagnosed in a known state is supplied from an exterior sourse, the diagnosis result on the subject portion is equal to the result expected from the known state if the subject portion is normal, but the expected result is not obtained if the subject portion is not normal, and thus a fault diagnosis can be done by comparing the diagnosis result in the known state with the expected result.

Figure 25:
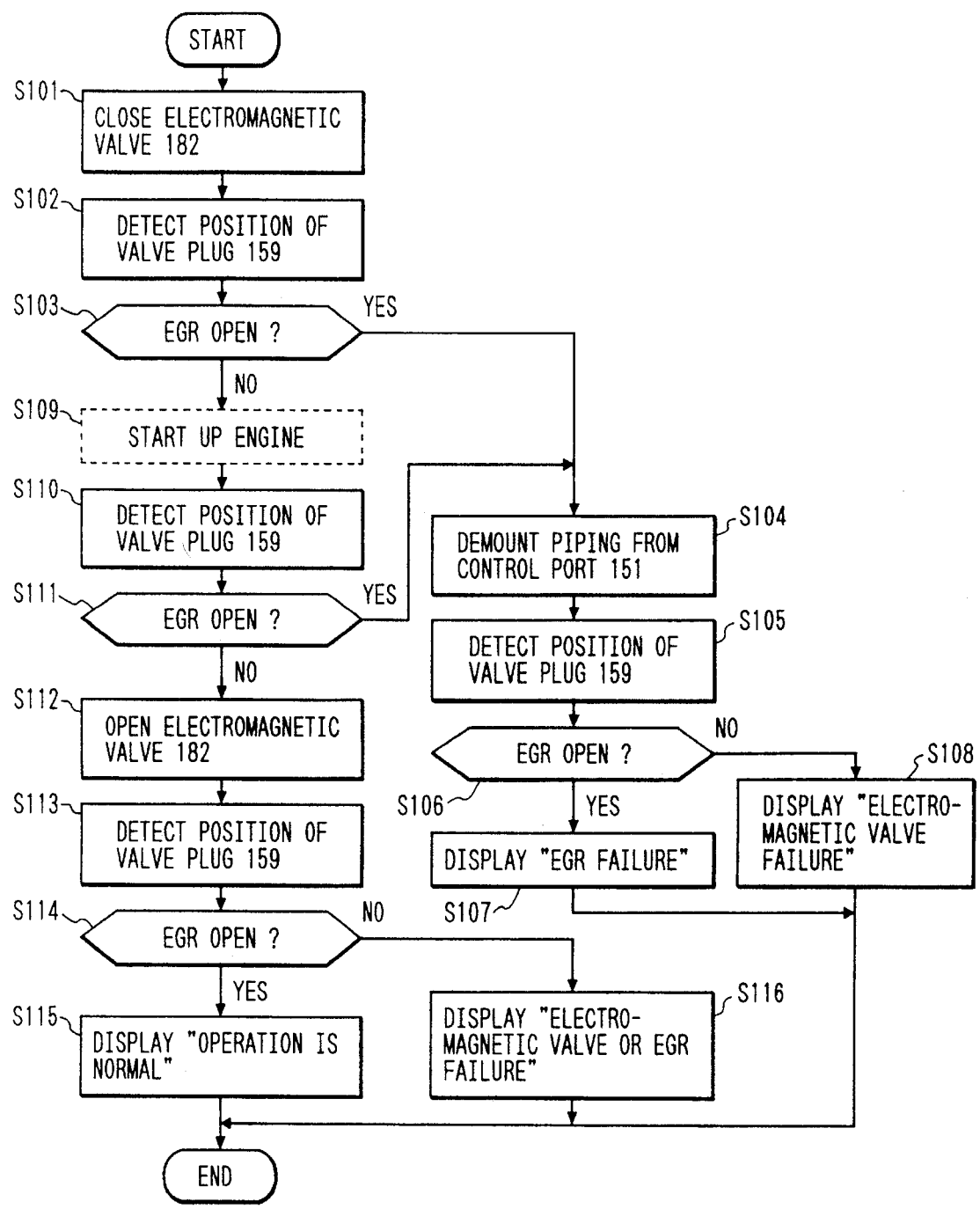
FIG. 25 is a flowchart showing an example of the method for diagnosing EGR failure according to the present invention.
Figure 31:
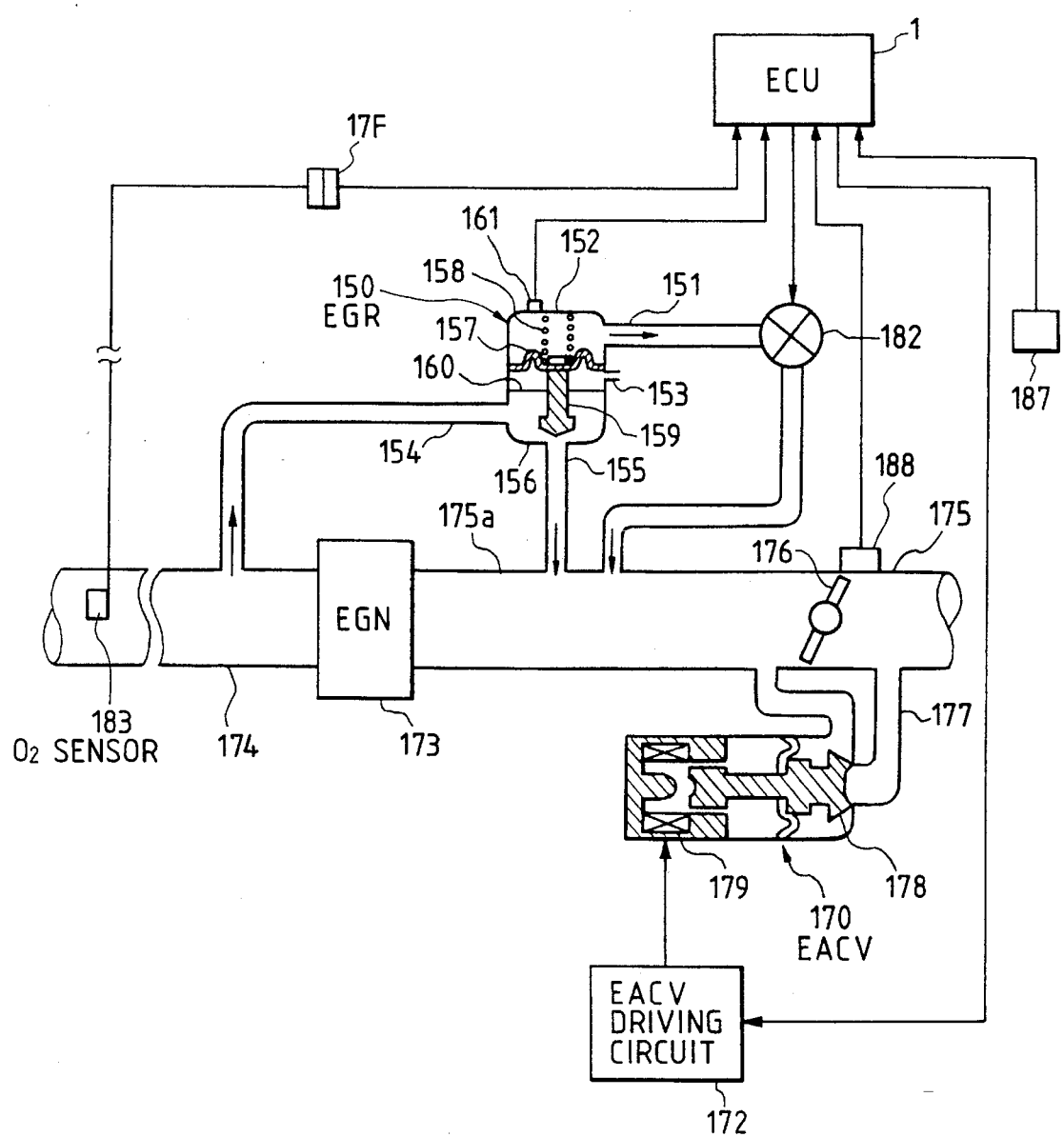
FIG. 31 is a partly sectional view showing the construction of the exhaust system of the typical engine.
Figure 32:
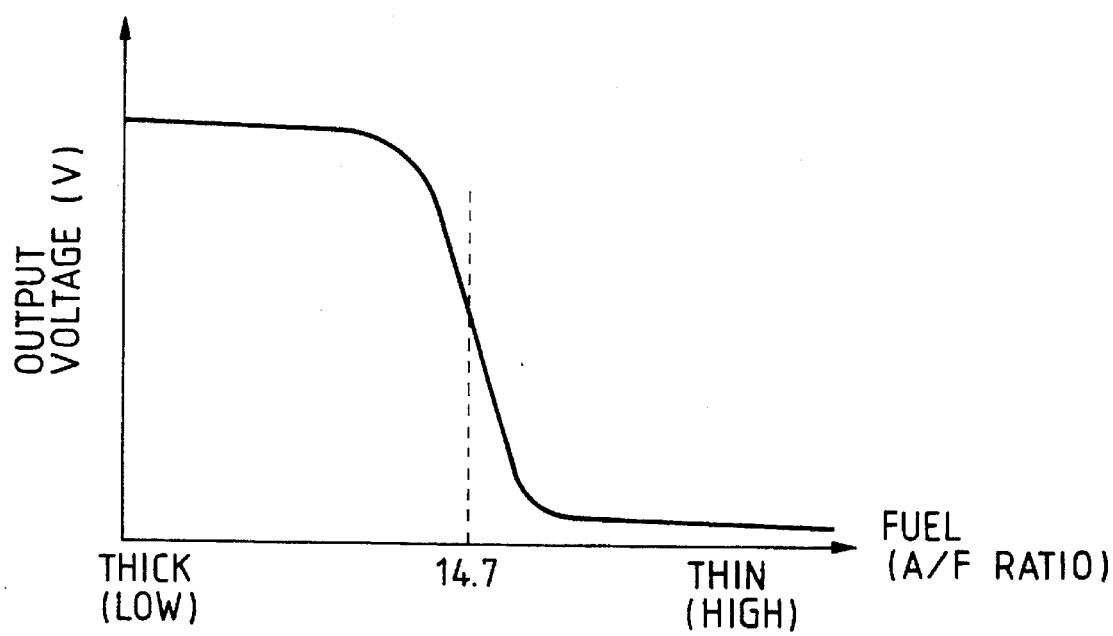
FIG. 32 is a graph showing the relationship between the $O_2$ sensor output voltage and the air-fuel ratio.
Figure 33:
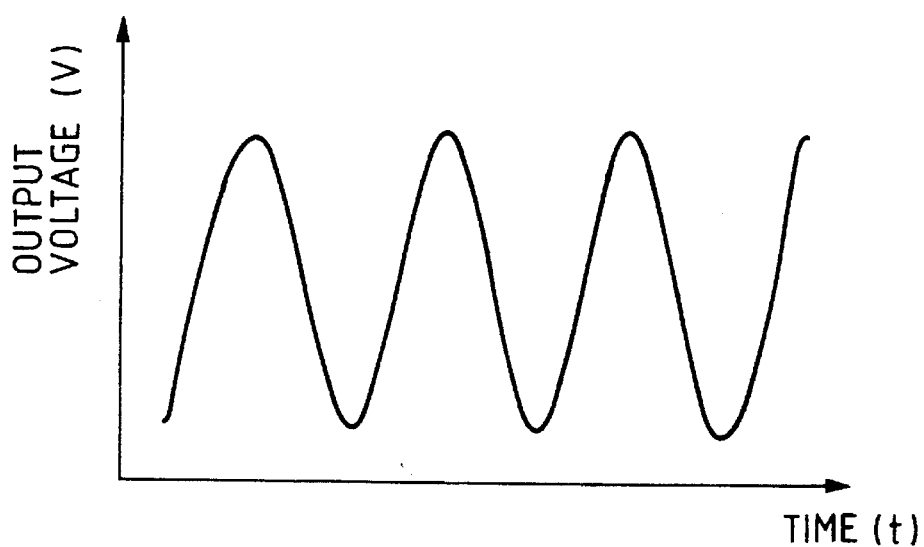
FIG. 33 is a graph showing the output voltage characteristics of the $O_2$ sensor.

FIG. 25 is a flowchart showing the first mode of the method for diagnosing EGR as shown in FIG. 31 according to the present invention. In the figure, the processing surrounded by a dashed line represents a processing by the repairman of the fault diagnostic system 2.

In step S101, instructions to forcibly close electromagnetic valve 182 are output from fault diagnostic system 2 to ECU 1 while the engine is in a stop condition, and ECU 1 closes electromagnetic valve 182 in response to the instructions. In step S102, in response to the instructions from fault diagnostic system 2, ECU 1 detects the position of valve plug 159 based on the output signal of lift sensor 161. In step S103, fault diagnostic system 2 judges whether or not the EGR is open according to the detection result by ECU 1, and judges that the EGR is in a failure if the EGR is open despite the fact there is no negative pressure being generated because the engine is stopped, then the process goes to step S104.

In step S104, instructions to demount the piping from control port 151 of the EGR are displayed on display means 27 of fault diagnostic system 2. When the repairman removes the piping and depresses the enter key of fault diagnostic system 2, in step S105, instructions to detect the output signal of lift sensor 161 are output from fault diagnostic system 2 to ECU 1, and ECU 1 detects the position of valve plug 159 according to the output signal of lift sensor 161.

In step S106, fault diagnostic system 2 judges the opened state of the EGR according to the detection result by ECU 1, and fault diagnostic system 2 judges "EGR failure" if the EGR is still in the opened state, and displays the judgment result on display means 27 in step S107. Fault diagnostic system 2 judges "electromagnetic valve failure" if the EGR is in the closed state, and displays the judgment result on display means 27 in step S108.

On the other hand, if it is judged in step S103 that the EGR is not open, then in step S109, work instructions to start up the engine are displayed on display means 27 of fault diagnostic system 2, and the repairman starts up the engine.

In step S110, instructions to again detect the output signal of lift sensor 161 are output from fault diagnostic system 2 to ECU 1, which detects the position of valve plug 159 by the output signal of lift sensor 161. In step S111, fault diagnostic system 2 judges the opened state of the EGR according to the detection result by ECU 1, and judges an operational failure if the EGR is in the opened state, and the process flows to the step S104 to execute a diagnostic process similar to the above described one.

On the other hand, if the EGR is judged to not be in an open state, then in step S112, instructions to forcibly put electromagnetic valve 182 in the opened state are output from fault diagnostic system 2 to ECU 1, which opens electromagnetic valve 182 in response to the instructions. In step S113, instructions to again detect the output signal of lift sensor 161 are output from fault diagnostic system 2 to ECU 1, which detects the position of valve plug 159 according to the output signal of lift sensor 161.

In step S114, fault diagnostic system 2 judges the opened state of the EGR according to the detection result by ECU 1, and if the EGR is in the closed state, judges the EGR or the electromagnetic valve is faulty and displays the judgment result on display means 27 in step S116. However, fault diagnostic system 2 judges that the EGR is normal if it is in the opened state, and displays the judgment result on display means 27 in step S115.

Figure 26:
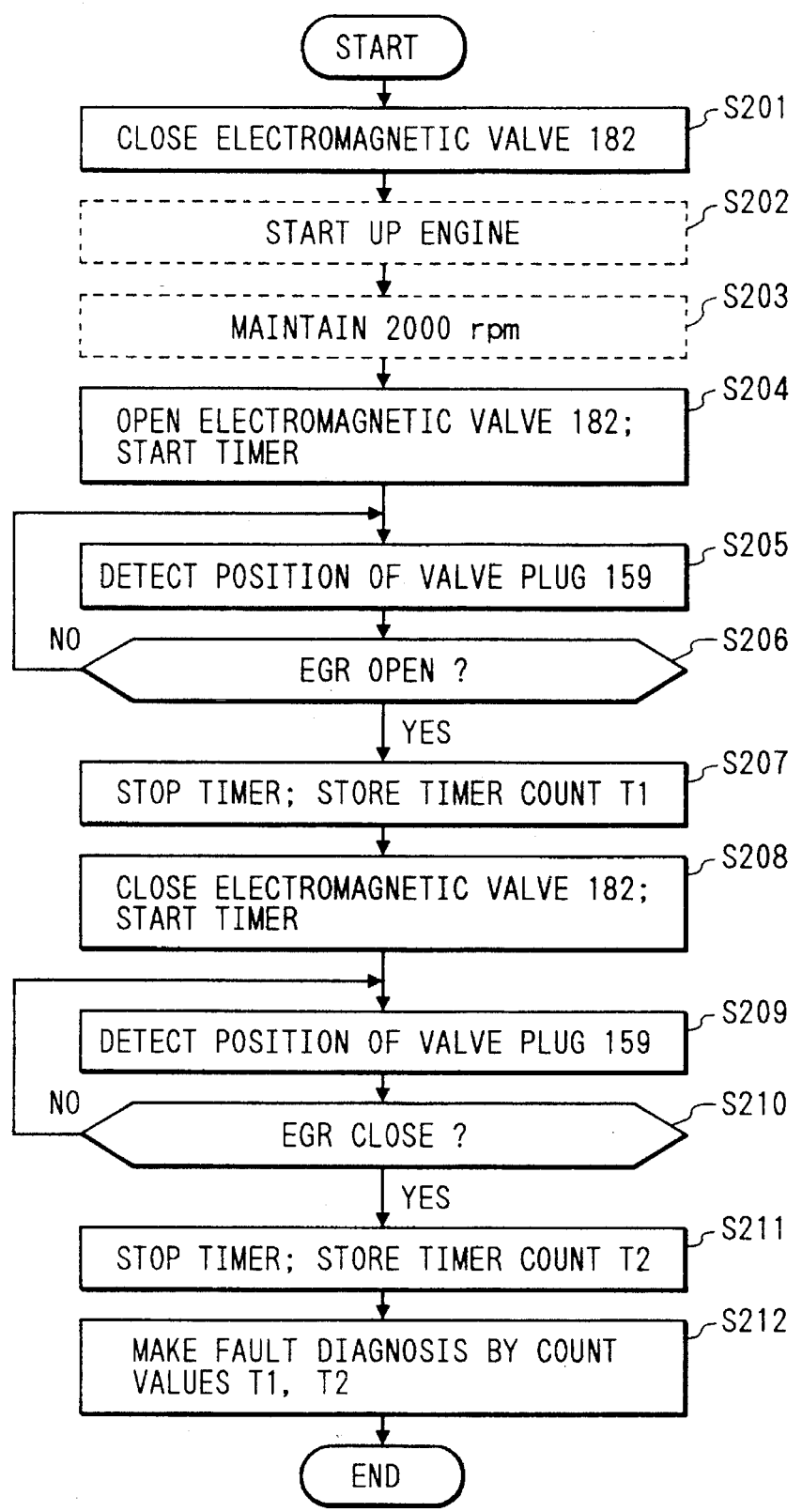
FIG. 26 is a flowchart showing another example of the method for diagnosing EGR failure according to the present invention.
Figure 30:
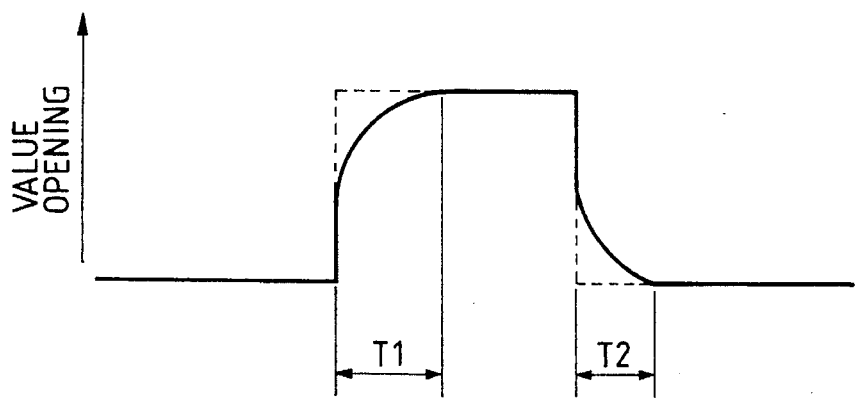
FIG. 30 is a graph for explaining the diagnostic method of FIG. 28.

FIG. 26 is a flowchart showing the second aspect of the fault diagnostic method for EGR according to the present invention, and FIG. 30 is a graph showing the diagnostic contents by the fault diagnostic method.

When a fault diagnosis is started, then in step S201, instructions to forcibly put electromagnetic valve 182 in the closed state are output from fault diagnostic system 2 to ECU 1, which in turn closes electromagnetic valve 182 in response to the instructions. In step S202, work instructions to start up the engine are displayed on display means 27 of fault diagnostic system 2, and the repairman starts up the engine according to the instructions.

In step S203, instructions to maintain the engine speed, for instance, at 2000 rpm are displayed on display means 27 of fault diagnostic system 2, and if the engine speed is kept at 2000 rpm and the enter key of fault diagnostic system 2 is depressed, then in step S204, instructions to forcibly put electromagnetic valve 182 in the opened state are output from fault diagnostic system 2 to ECU 1, which in turn opens electromagnetic valve 182 in response to the instructions. A timer (not shown) starts at the moment electromagnetic valve 182 begins to open.

In step S205, instructions to detect the output signal of lift sensor 161 are output from fault diagnostic system 2 to ECU 1, which in turn detects the position of valve plug 159 according to the output signal of lift sensor 161. In step S206, it is judged based on the position detection result whether or not the EGR has been in opened state. If the judgment is positive, then the timer is stopped and the count value T1 of the timer, that is, the response time of opening of the electromagnetic valve 182 is stored in a memory in step S207.

In step S208, the timer is reset, and instructions to forcibly put electromagnetic valve 182 in the closed state are output from fault diagnostic system 2 to ECU 1, which in turn closes electromagnetic valve 182 according to the instructions. And the timer starts at the same time electromagnetic valve 182 begins to close. In step S209, instructions to again detect the output signal of lift sensor 161 are output from fault diagnostic system 2 to ECU 1, which in turn detects the position of valve plug 59 according to the output signal of lift sensor 161.

In step S210, it is judged by the position detection result whether or not the EGR has been put in the closed state, and if the EGR is in the closed state, then in step S211, the timer stops and the count value T2 or the response time of closing of the electromagnetic valve 182 is stored in the memory.

In step S212, the count values T1 and T2 are read out from the memory and compared with reference values, respectively. If the count values T1 and T2 are smaller than the reference values, it is judged that the responsibility of electromagnetic valve 182 is "normal", and if they are greater than the reference values, it is deemed that the responsibility has degraded and a judgment of "EGR failure" is made.

Figure 27:
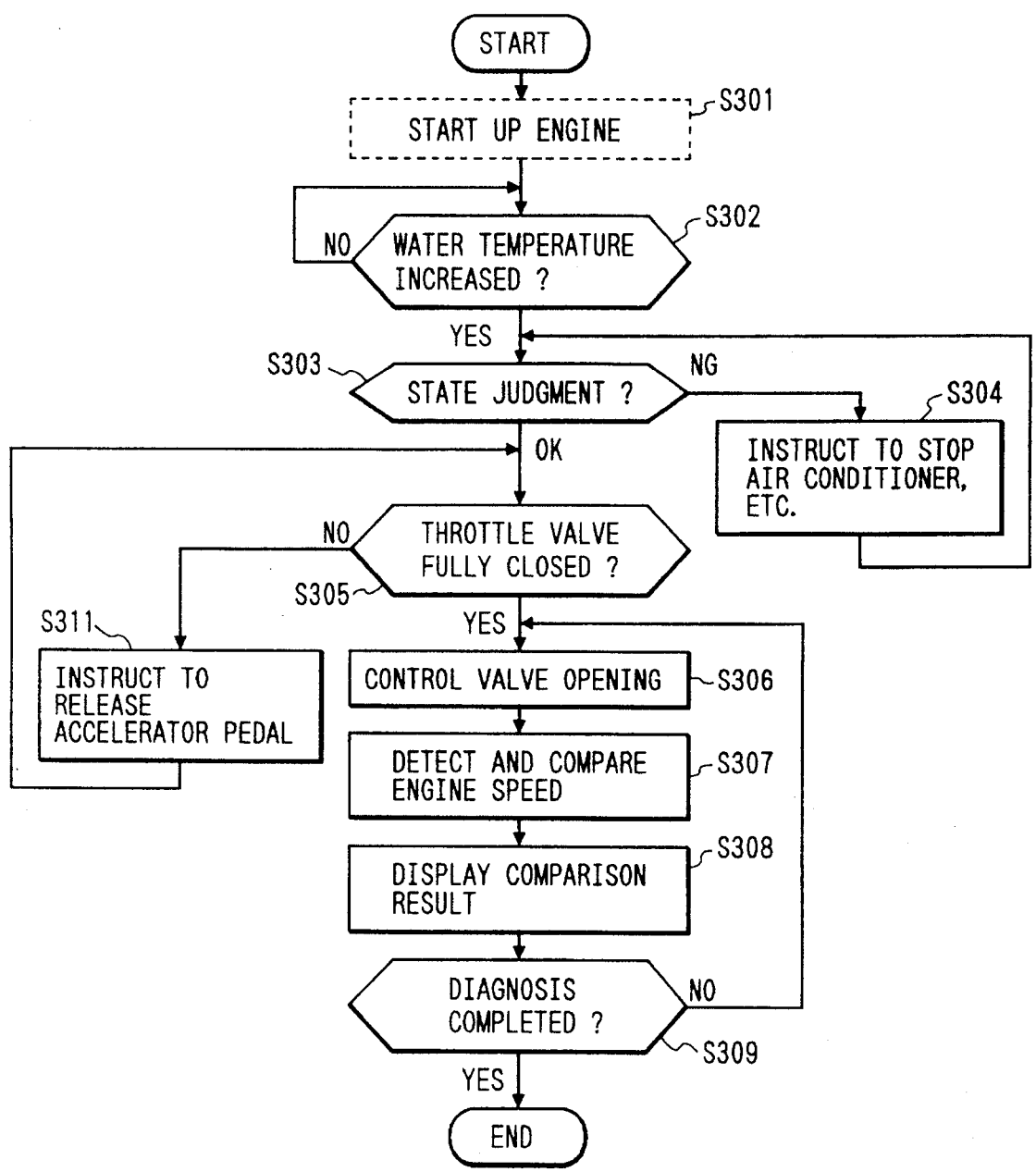
FIG. 27 is a flowchart showing an example of the method for diagnosing EACV failure according to the present invention.
Figure 29:
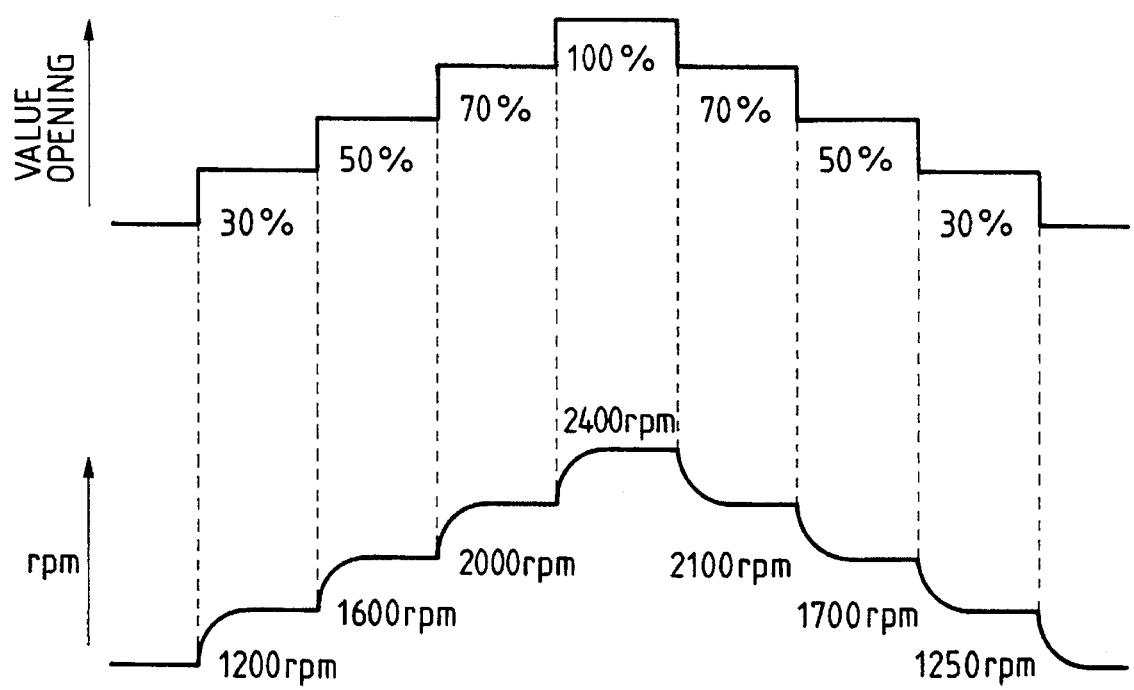
FIG. 29 is a graph for explaining the diagnostic method of FIG. 27.

FIG. 27 is a flowchart showing the fault diagnostic method of EACV according to the present invention, and FIG. 29 is a graph showing the diagnostic contents by the fault diagnostic method.

In step S301, work instructions to start up the engine are displayed on display means 27 of fault diagnostic system 2, and the repairman starts up the engine. In step S302, instructions to detect the temperature of the engine cooling water are output from fault diagnostic system 2 to ECU 1, which in turn outputs the temperature detected by cooling water temperature sensor 187 to fault diagnostic system 2.

If fault diagnostic system 2 confirms that the temperature of the cooling water is high enough to have warmed up the engine, then in step S303, it judges ON/OFF of the electrical equipments such as the air conditioner, power steering and head lamp which affect the engine speed, and if they are ON, it provides a display to stop them on display means 27 in step S304. The operator turns off all the electrical equipments accordingly.

In step S305, whether or not the throttle valve is fully closed is judged by the output signal of throttle sensor 188, and if the throttle valve is not fully closed, instructions to release the accelerator pedal are displayed on display means 27 in step S311.

When the preparation for fault diagnosis is completed as described above, then in step S306, instructions to set the valve opening at 10% are output first from fault diagnostic system 2 to ECU 1, which in turn supplies a current corresponding to the valve opening of 10% to solenoid coil 179. In step S307, instructions to measure the engine speed are output from fault diagnostic system 2 to ECU 1, which in turn outputs the detected engine speed to fault diagnostic system 2. And the detected engine speed is compared with a reference speed prestored as the engine speed corresponding to the valve opening of 10%. The comparison result is displayed on display means 27 in step S308.

In step S309, it is judged whether or not the measurement for all the predetermined valve openings has been completed, and as shown in FIG. 29, if the fault diagnosis for the valve openings of 30%, 50%, ... 100%, 70%, ... 10% has been completed, the process terminates. If the measurement has not been completed, the process returns to step S306, where the respective valve openings are sequentially set and the matching between the engine speed and the valve opening is tested.

Figure 28:
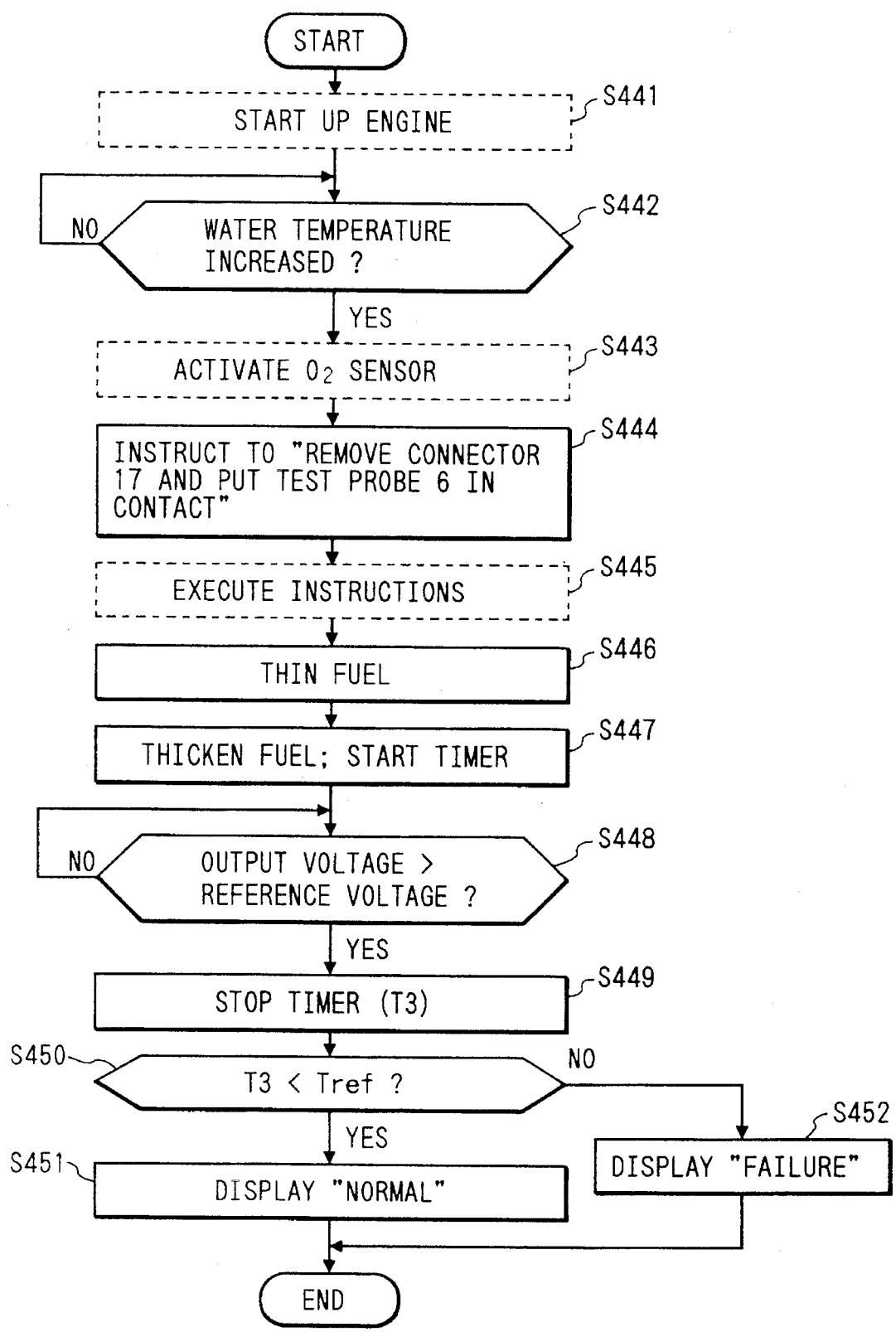
FIG. 28 a flowchart showing an example of the method for diagnosing $O_2$ sensor failure according to the present invention.

FIG. 28 is a flowchart showing the fault diagnostic method of $O_2$ sensor 183 according to the present invention.

In step S441, instructions to start up the engine are displayed on display means 27 of fault diagnostic system 2, and the repairman starts up the engine. In step S442, instructions to detect the temperature of the engine cooling water are output from fault diagnostic system 2 to ECU 1, which in turn outputs the temperature detected by cooling water temperature sensor 187 to fault diagnostic system 2.

When fault diagnostic system 2 confirms that the temperature of the cooling water has risen and the engine has fully been warmed up, then in step S443, instructions to step on the accelerator pedal several times to activate $O_2$ sensor 183 are displayed. If the activation of $O_2$ sensor 183 completes, then in step S444, instructions to disconnect the connector 17 and put test probe 6 in contact with the associated wire harness are displayed.

In step S445, the repairman disconnects the specified connector 17 and puts test probe 6 in contact with the wire harness connected to the connector (if the connector connects a plurality of wire harnesses, the wire harness of specified color). In step S446, instructions to decrease the fuel supply to increase the air-fuel ratio (to thin the fuel) are output from fault diagnostic system 2 to ECU 1, which in turn controls the EFI to increase the air-fuel ratio.

In step S447, instructions to increase the fuel supply to decrease the air-fuel ratio (to thicken the fuel) are output from fault diagnostic system 2 to ECU 1, and when ECU 1 begins to control the EFI to thicken the fuel, a timer starts counting the reference clock pulses.

In step S448, fault diagnostic system 2 monitors the output voltage of $O_2$ sensor 183 which is input from test probe 6. When the air-fuel ratio decreases and the output voltage of $O_2$ sensor 183 exceeds a predetermined reference voltage, the timer stops the counting of the reference clock pulses in step S449.

In step S450, the count value T3 of the timer is compared with a predetermined reference value Tref, and if the count value T3 is smaller than the reference value Tref and the responsibility of $O_2$ sensor is good, then in step S451, a display indicating "normal" is provided, whereas if the count value T3 is larger than Tref and the responsibility of $O_2$ sensor is not good, then in step S452, a display indicating "failure" is provided.

In accordance with the embodiment of the present invention, since a known state is positively created by an external known signal input, a fault diagnosis is performed according to whether or not the checking result obtained is the one expected from the known state.

Although the present invention has been described by taking the diagnosis of some parts or subassemblies as examples, the present invention is not limited to these, but it can be applied to any other subjects or parts to be diagnosed, provided that a known state is positively reproduced for the subjects or parts to be diagnosed for which the faulty portion and fault state are difficult to quantitatively discriminate, and that a fault diagnosis is performed according to whether or not the checking result is the expected one.

What is claimed is:

1. A fault diagnostic system for connection to a computer-aided electronic control unit carried on a vehicle for detecting and diagnosing faults in vehicle parts connected to said electronic control unit, said fault diagnostic system comprising:

means for providing a control unit identification code that identifies the type of electronic control unit that is being carried on the vehicle;

means for providing a vehicle identification code that identifies the type of vehicle on which the electronic control unit is being carried;

storage means for storing a plurality of diagnostic programs;

a priority table in which a fault code and diagnostic priority are assigned for an electronic control unit fault and for each faulty vehicle part respectively;

abnormality detecting means for detecting abnormality of said electronic control unit and vehicle parts and outputting a fault code corresponding to each abnormality;

means responsive to detection of a plurality of abnormalities for accessing said priority table using the plurality of fault codes output from said abnormality detecting means as retrieval keys, and displaying the fault codes corresponding to said abnormalities along with said priority; and program selecting means jointly responsive to said control unit identification code, to said vehicle identification code, and to a fault code and priority selected by an operator from said display for retrieving one of said diagnostic programs from said storage means for use by said fault diagnostic system.

2. The fault diagnostic system of claim 1 including means for performing a self-diagnostic function for detecting and recording a fault of peripheral equipment connected to said electronic control unit and outputting a fault code, and for communicating with the electronic control unit to diagnose a detected fault of said electronic control unit and peripheral equipment, said fault diagnostic system comprising:

communication control means for performing data communication with said electronic control unit, first fault code storage means for storing a fault code output from said self-diagnostic means, self-diagnosis restarting means for restarting said self-diagnostic means in response to storage of said fault code into said first fault code storage means, second fault code storage means for storing a fault code output from said self-diagnostic means when said self-diagnostic means is restarted, and means for comparing the contents stored in said first and second fault code storage means to judge that the fault is continuous when said contents stored in said two fault code storage means are coincident with one another, or to judge that the fault is temporary when said stored contents are different from one another.

3. The fault diagnostic system of claim 1 including a self-diagnostic means for detecting and recording a fault of peripheral equipment connected to said electronic control unit and outputting a fault code, and for communicating with the electronic control unit to diagnose a detected fault of said electronic control unit and peripheral equipment, said fault diagnostic system comprising:

communication control means for performing data communication with said electronic control unit, fault code storage means for storing a fault code output from said self-diagnostic means, first means responsive to storage of the fault code in said fault code storage means for resetting a fault code recorded in the electronic control unit, memory means for prestoring a reference value uniquely associated with a given piece of peripheral equipment for use in judging the nature of a fault of said peripheral equipment, and second means responsive to detection of a peripheral equipment fault by said self-diagnostic means for comparing an output signal of the peripheral equipment with the prestored reference value associated with said peripheral equipment to judge that a fault, represented by the fault code stored in said fault code storage means, is continuous when the output signal of said peripheral equipment is not substantially equal to its prestored reference value, and to judge that the fault is temporary when the output signal off said peripheral equipment is substantially equal to its prestored reference value.

4. The fault diagnostic system of claim 1 including a means for detecting and recording a fault of peripheral equipment connected to said electronic control unit and for displaying a procedure to be used in identifying the source and nature of a detected fault of said electronic control unit and peripheral equipment, said fault diagnostic system comprising:

first storage means for storing therein a plurality of work procedures useful respectively for identifying the source of a detected fault corresponding to a fault code, second storage means for storing therein a plurality of fault judgment criteria to be used respectively in the performance of each of said work procedures, first selecting means for selecting from said first storage means a work procedure corresponding to a fault code provided to said fault diagnostic system by data communication from the electronic control unit, second selecting means for selecting from said second storage means fault judgment criterion corresponding to said selected work procedure for use in the performance of said selected work procedure, display means for displaying the work procedure selected by the first selecting means, and means for judging the characteristics of a fault on the basis of said selected fault judgment criterion during the performance of said displayed work procedure to identify the source and nature of a detected fault.

5. The fault diagnostic system of claim 1 including:

means creating an operation state of the vehicle to be checked by providing a known signal input from the external diagnostic system, means comparing a quantitative measured value, obtained from particular peripheral equipment to be diagnosed in the operation state of the vehicle produced by said known signal input, with a normal value expected to be obtained from said particular peripheral equipment in said operation state, and means diagnosing that the particular peripheral equipment is faulty when the comparison results in a deviation between said values that exceeds a predetermined amount.

6. The fault diagnostic system of claim 5 wherein said peripheral equipment is an $O_2$ sensor for detecting an air/fuel ratio in a fuel gas supplied to said vehicle, and the known signal input from the external diagnostic system is a signal for rapidly changing the supplied fuel gas amount in the operation state of the vehicle to be checked, a variation of the $O_2$ sensor output, responsive to said rapid change known being compared with the expected variation of the $O_2$ sensor output to perform a fault diagnosis.

7. The fault diagnostic system of claim 6 wherein said signal input increases the supplied fuel gas amount after decreasing it once, and a time duration from the point when the signal for increasing the supplied fuel gas amount is provided to the point when the $O_2$ sensor output reaches a predetermined reference value is compared with a predetermined reference value of the time duration.

8. The fault diagnostic system of claim 5 wherein said peripheral equipment is an exhaust gas recirculation device for recirculating exhaust gas into the combustion chamber of the vehicle engine consisting of piping communicating between the inlet manifold and outlast manifold of the engine of the vehicle, a valve plug in said piping to control the recirculation amount of the exhaust gas, and an electromagnetic valve for controlling the position of said valve plug, and the known signal input from the external diagnostic system is a signal for opening or closing said electromagnetic valve during stop and operation states of the vehicle engine, respectively, characterized in that a valve plug position detected in response to each signal for opening and closing the electromagnetic value is compared with a valve plug position expected for each signal for opening or closing the electromagnetic valve, and a fault diagnosis is performed based upon the result of said comparison.

9. The fault diagnostic system of claim 5 wherein said peripheral equipment is an exhaust gas recirculation device for recirculating exhaust gas into the combustion chamber of the vehicle engine consisting of piping communicating between the inlet manifold and outlet manifold of the engine of the vehicle, a valve plug in said piping to control the recirculation amount of the exhaust gas, and an electromagnetic valve for controlling the position of said valve plug, and the known signal input from the external diagnostic system is a signal for opening or closing said electromagnetic valve during operation states of the vehicle engine, characterized in that at least one of the times required by the valve plug to open or close in response to the opening and closing signal is compared with the time expected for each signal, and a fault diagnosis is performed on the basis of said comparison.

10. The fault diagnostic system of claim 5 wherein said peripheral equipment is an EACV device consisting of piping communicating between the upstream and downstream of a throttle valve, and a control valve in said piping, said EACV device controlling the bypass supply fuel amount by means of the control valve thereby to control engine speed when the engine of a vehicle to be checked is idling, and the known signal input from the external diagnostic system is a signal for holding said control valve at various predetermined openings during the idling of the vehicle engine, characterized in that the engine speeds at said various predetermined openings of said control valve are compared with the engine speeds expected for the individual predetermined openings, and a fault diagnosis is performed based upon the result of said comparison.

* * * * *